(12) United States Patent
Freel et al.

(10) Patent No.: US 6,844,420 B1
(45) Date of Patent: Jan. 18, 2005

(54) NATURAL RESIN FORMULATIONS

(75) Inventors: Barry Freel, Greely (CA); Robert G. Graham, Nepean (CA); Régi Giroux, Fort McMurray (CA)

(73) Assignee: Ensyn Renewables, Inc., Boston, MA (US)

( * ) Notice: Subject to any disclaimer, the term of this patent is extended or adjusted under 35 U.S.C. 154(b) by 0 days.

(21) Appl. No.: 10/048,184

(22) PCT Filed: Jul. 28, 2000

(86) PCT No.: PCT/CA00/00868

§ 371 (c)(1),
(2), (4) Date: Sep. 17, 2002

(87) PCT Pub. No.: WO01/09243

PCT Pub. Date: Feb. 8, 2001

Related U.S. Application Data

(63) Continuation-in-part of application No. 09/364,610, filed on Jul. 29, 1999, now Pat. No. 6,326,461.

(51) Int. Cl.[7] .......................... C08G 16/02; C08H 5/04; C08L 97/02; C10C 5/00
(52) U.S. Cl. ....................... 530/200; 530/202; 530/205; 530/210
(58) Field of Search ............................... 530/200, 202, 530/205, 210

(56) References Cited

U.S. PATENT DOCUMENTS

| | | |
|---|---|---|
| 1,598,547 A | 8/1926 | Barbet |
| 3,762,989 A | 10/1973 | Timpe |
| 4,029,617 A | 6/1977 | Dhein et al. |
| 4,139,500 A * | 2/1979 | Rudolphy ............... 525/54.44 |
| 4,209,647 A | 6/1980 | Gallivan et al. |
| 4,233,465 A | 11/1980 | Gallivan et al. |
| 4,673,460 A | 6/1987 | Raff |
| 4,942,269 A | 7/1990 | Chum et al. |
| 5,034,498 A | 7/1991 | Himmelblau |
| 5,115,084 A | 5/1992 | Himmelblau |
| 5,235,021 A | 8/1993 | Chum et al. |
| 5,405,932 A | 4/1995 | Bender et al. |
| 5,698,668 A | 12/1997 | Bender |
| 5,708,078 A | 1/1998 | Bender et al. |
| 5,792,340 A | 8/1998 | Freel et al. |
| 6,326,461 B1 * | 12/2001 | Giroux et al. ............. 530/200 |
| 6,555,649 B2 * | 4/2003 | Giroux et al. ............. 530/200 |

FOREIGN PATENT DOCUMENTS

| | | |
|---|---|---|
| CA | 2 228 418 | 7/1999 |

OTHER PUBLICATIONS

Dr. S. Scott, "Chemicals and Fuels from Biomass Flash Pyrolysis—Part of the Bioenergy Development Program (BDP)," Feb. 1988, (pp. vii, ix, x, xi, 87–97).

T. Sellers, Jr., "Technical And Market Opportunities For Glued Wood Products," *Adhesives Age*, May 31, 1996 (pp. 6–9).

D. Andrew Himmelblau, "Production of Wood Composite Adhesives With Air–Blown, Fluidized–Bed Pyrolysis Oil," circa 1998.

H. Pakdei, et al. "Phenolic Compounds from Vacuum Pyrolysis of Biomass," *Bio–oil Production & Utilization—Proceedings of the 2nd EU–Canada Workshop on Thermal Bioenergy*, Feb. 1996, (pp. 124–131).

Stephen S. Kelly, et al., "Use of Biomass Pyrolysis Oils for Preparation of Modified Phenol Formaldehyde Resins," *Developments in Thermochemical Biomass Conversion*, 1st ed., 1997, pp. 557–570.

H. Chum, et al. "Chapter 11 Biomass Pyrolysis Oil Feed-stocks for Phenolic Adhesives," *Adhesives From Renewable Resources*, (1989), pp. 135–151.

K. G. Forss et al., "Finnish Plywood, Particleboard, and Fiberboard Made With a Lignin–Base Adhesive," *Forest Products Journal*, pp. 39–43.

J.T. White, "Wood Adhesives and Binders," *Forest Products Journal*, vol. 45, No. 3, Mar. 1995, pp. 21–28.

International Search Report for related application PCT/CA99/00051, mailed Jun. 17, 1999.

Written Opinion for related application PCT/CA99/00051, mailed Dec. 2, 1999.

International Search Report for related application PCT/CA00/00868, mailed Oct. 30, 2000.

Written Opinion for related application PCT/CA00/00868, mailed Mar. 23, 2001.

* cited by examiner

Primary Examiner—Nathan M. Nutter
(74) Attorney, Agent, or Firm—Brinks Hofer Gilson & Lione

(57) ABSTRACT

This invention is directed to a method of preparing a natural resin by liquefying wood, bark, forest residues, wood industry residues, or other biomass using rapid destructive distillation (fast pyrolysis). Fast pyrolysis produces both vapors and char from biomass, and following removal of the char from the product vapors, a liquid pitch product is recovered and processed by distillation, evaporation, or a combination thereof, in order to obtain a natural resin which may be in either liquid or solid form. The natural resin comprises a total phenolic content from about 30% to about 80% (w/w), and is a highly-reactive ligninic compound that has been found to be suitable for use within resin formulations without requiring any further extraction or fractionation procedures. Resins comprising up to 60% natural resin have been prepared and tested in board production and found to exhibit similar properties associated with commercially available resins. The natural resin may substitute for phenol, or for both phenol and formaldehyde within phenol-containing resins. Similarly, the natural resin can replace a substantial part of the components within urea-containing resins.

30 Claims, 6 Drawing Sheets

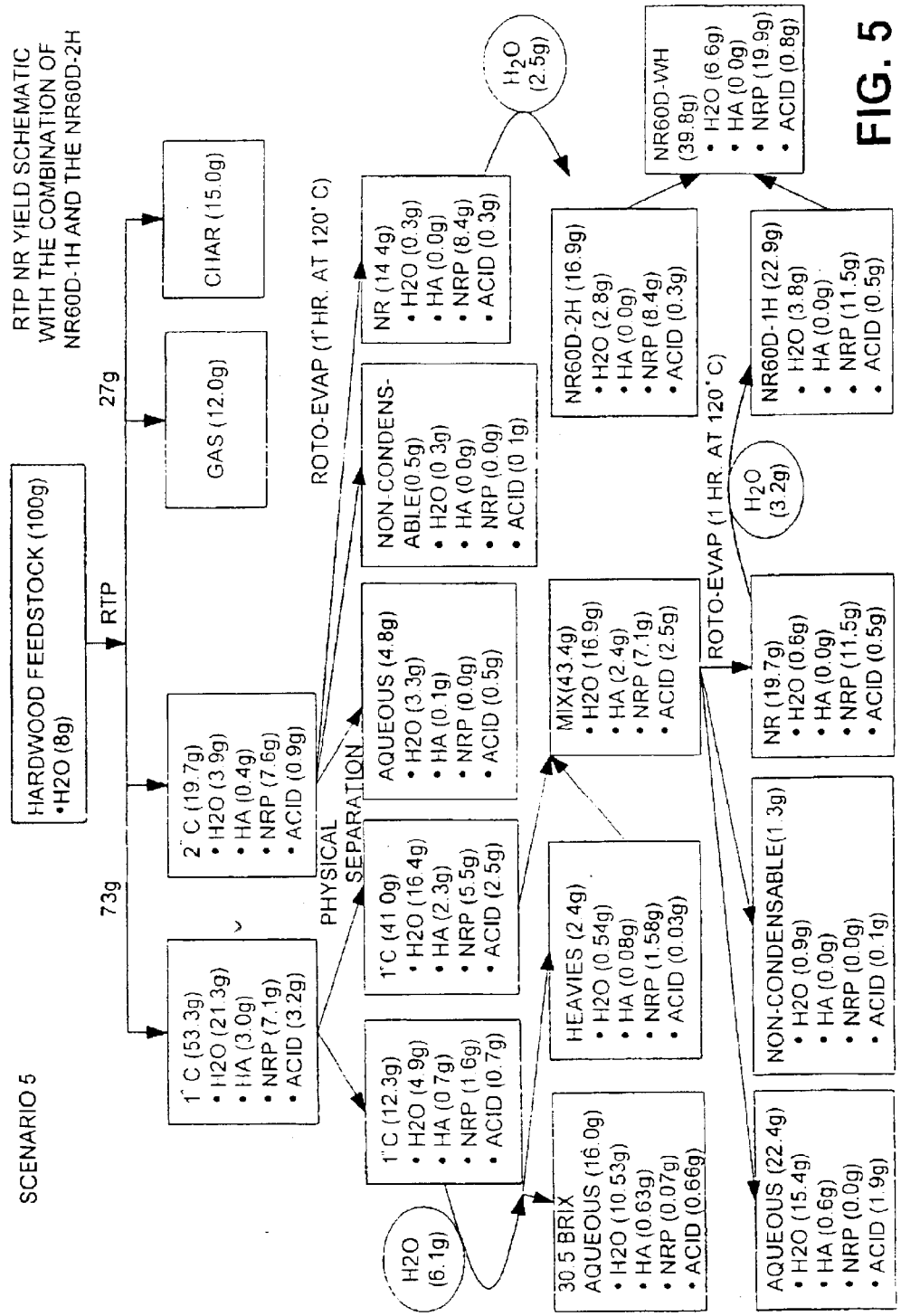

NATURAL RESIN FORMULATIONS

This application is the National Stage of International Application PCT/CA00/00868, filed on Jul. 28, 2000, which is a continuation-in-part of U.S. application Ser. No. 09/364, 610, filed Jul. 29, 1999, now U.S. Pat. No. 6,326,461.

The present invention relates to the production and use of a natural resin, derived from wood, bark, forest residues, wood industry residues and other biomass materials using destructive distillation, its use as an adhesive in the manufacture of manufactured wood products, and its use in other resin formulations.

BACKGROUND OF THE INVENTION

"Resin" is a generic term used to describe both natural and synthetic glues which derive their adhesive properties from their inherent ability to polymerize in a consistent and predictable fashion. The vast majority of modern industrial resins are synthetic, and are normally derived from petroleum feedstocks. Two of the most important classes of synthetic resins, in terms of production volume and total sales are phenol formaldehyde (P/F) and urea formaldehyde (U/F) resins. In both cases, the principal market application is for use as a glue binder in man-made wood products.

Phenol formaldehyde (P/F) resin, because of its resistance to moisture, has a particular value in external (outdoor) or damp environments. It is therefore, the leading adhesive used for the manufacture of plywood, oriented strand board (OSB) and wafer board (Sellers, 1996). P/F resins are also widely used in laminates, insulation, foundry materials, moulding compounds, abrasives and friction materials for the transportation industry (ie., clutch facings, disk facings and transmission components). As its name suggests, the principal ingredients in P/F adhesives are phenol and formaldehyde. However, the finished product is actually a mixture of P/F, caustic, and water,. Assorted fillers, extenders and dispersion agents may then be added for specific adhesive applications.

The formaldehyde ingredient in P/F resin is derived from methanol, normally produced from natural gas. The phenol ingredient is typically manufactured from benzene and propylene via a cumene intermediate. In addition to P/F adhesive manufacture, phenol is used in the manufacture of other important products, for example, Bisphenol A and Caprolactam. Bisphenol A is a principal component in polycarbonates used in automotive parts, compact discs and computer discs, and Caprolactam is a raw material for Nylon 6, used within stain resistant carpets.

When mixed together in water and with caustic added as a catalyst, phenol and formaldehyde undergo a condensation reaction to form either ortho- or para-methylolphenol. The resultant PF resin, as shipped to market, is a dark brown liquid which is polymerized and cross-linked to an intermediate degree. It is then cured in the final board, laminate or other product without catalyst simply with the addition of heat at which time the final polymerization and cross-linking take place via condensation reactions. The release of free formaldehyde during the resin manufacture and resin use stages is a concern from a health and safety perspective. Furthermore, the costs associated with formaldehyde production have increased and there is a need in the art for alternative materials for use as wood adhesives and binders.

One alternative for phenol that has been considered are lignins which have been recovered from wood, wood residues, bark, bagasse and other biomass via industrial or experimental processes Natural lignin (i.e. the polymer which occurs in nature which holds wood and bark fibres together and gives wood its strength) and P/F formaldehyde resins are structurally very similar. Lignin is a random network polymer with a variety of linkages, based on phenyl propane units. Lignin-based adhesive formulations have been tested for use within plywood, particle board and fibre board manufacture. The addition of polymeric lignin to P/F formulations has been found to prematurely gel the P/F resin thereby reducing shelf life, limiting permeation of the lignin-P/F resin into the wood and producing an inferior mechanical bond (Kelley 1997). It is important to note that lignins which are isolated and recovered from biomass, and which have been tested in resin formulations, are not identical to the natural lignin present in the original biomass, but are altered somewhat by the recovery process. Some examples of recovered lignins which have been tested in PF resin formulations are Kraft lignin, lignosulphonates, Alcell™, Organocell™, pyrolytic lignin and natural resin of the present invention.

Pyrolysis of lignin has been considered as a potential approach to upgrading lignin to more usable phenolic type resins. While relatively mild thermal or thermo-catalytic processing at low pressures can be used to break the lignin macromolecules into smaller macromolecules, lignin segments and monomeric chemicals, such procedures may cause condensation reactions producing highly condensed structures such as char and tar, rather than depolymerized lignin fragments or monomeric chemicals.

A further alternative for the production of phenolic compounds involves use of pyrolytic pitch oils produced in the rapid destructive distillation (fast pyrolysis) of wood and other biomass. Fast pyrolysis can be achieved by rapid heat transfer to the feed material, by rapid removal of the product via a vacuum, or by a combination of rapid heat transfer and pyrolysis under vacuum. These pitch oils are comprised of a complex mixture of compounds including phenolic compounds, guaiacol, syringol and para substituted derivatives, carbohydrate fragments, polyols, organic acids, formaldehyde, acetaldehyde, furfuraldehyde and other oligomeric products (Pakdel et al 1996). However, wood-derived lignin and lignin-rich pyrolytic bio-oils have lacked consistency and have exhibited inferior properties when compared with phenol-formaldehyde resins (Chum et al. 1989; Scott 1988; Himmelblau 1997; Kelley et al., 1997).

Due to the complexity of pyrolytically-derived bio-oils, further processing is required in order to obtain suitable fractions useable as a replacement for phenol, or to be considered as an extender for petroleum-derived phenol within P/F resin formulations. Typically the phenolic derived from pyrolysis oils requires separation prior to use in order to remove impurities. One such method involves water extraction of the whole-oil, followed by precipitation and centrifugation or filtration and drying of the non-aqueous fraction to prepare a "pyrolytic lignin" fraction (Scott 1988). However, adhesive formulations prepared using pyrolytic lignin were found to be inferior to P/F resin formulations in both colour and odour, and required long press times in order to avoid de-lamination of waferboards. Tests indicated that none of the pyrolytic lignin samples meet the internal bond (IB) test requirement (Scott 1988, see pp. 91–92).

In U.S. Pat. No. 4,209,647 (Jun. 24, 1980) a fractionation method for the preparation of a phenol-enriched pyrolytic oil is disclosed which involved a multistep process that selectively solubilized neutral phenols, and organic acids of the whole-oil with NaOH followed by extraction with methylene chloride. However, this multistep process is costly, labourious, time consuming and involves the use of volatile solvents that are known to be health threatening.

Another fractionation method involves adding ethyl acetate to whole-oil pitch to produce ethyl acetate soluble and insoluble fractions. The ethyl soluble fraction is then isolated and the ethyl acetate evaporated to isolate a fraction containing phenolic and neutrals (P/N) derived from the pyrolytic oil (Chum et al. 1989, U.S. Pat. No. 4,942,269, Jul. 17, 1990, and U.S. Pat. No. 5,235,021, Aug. 10, 1993). Preliminary results with the P/N fractions revealed that fractionated pyrolytic oils could be used within P/F resin compositions, as P/N containing resins exhibited equivalent gel times as noted for P/F resins. However, the fractionation protocol is not suitable for industrial scale production, nor is this process cost effective for the preparation of alternative components for use within P/F resins at a commercial scale (Kelley et al., 1997).

All of the process disclosed within the prior art as outlined above involve the extraction of a phenol-enhanced fraction from the whole pyrolytic oil product using complex protocols involving precipitation, followed by centrifugation or filtration, or the use of solvents and alkali. None of the prior art discloses methods for the production of a bio-oil which is readily prepared from the whole pyrolytic oil or that exhibits properties suitable for adhesive use. Furthermore, the prior art does not disclose methods directed at producing a fraction of bio-oil suitable for adhesive use, yet that is simple to produce and that does not require any solvent extraction.

It is an object of the invention to overcome disadvantages of the prior art.

The above object is met by the combinations of features of the main claims, the sub-claims disclose further advantageous embodiments of the invention.

SUMMARY OF THE INVENTION

The present invention relates to the production and use of a natural resin, a highly reactive ligninic product, derived from wood, bark and other biomass residues using rapid destructive distillation, for example. fast pyrolysis. Specifically, the natural resins (NR) of this invention are obtained from the fast pyrolysis of wood products. The NR is obtained from a ligninic fraction of the liquid pitch product produced from fast pyrolysis of biomass.

By the processes of the present invention, there is no need to extract a phenol enhanced portion using solvents, water induced solids separation, or alkali. Rather the NR of this invention may be produced from a selected product fraction of the whole-oil obtained from the pyrolytic process, or from the whole-oil product. The whole-oil, selected product fraction, or a combination thereof, is processed in a manner that reduces non-resin components including odorous components and acids in order to produce NR. Such a processing step involves distillation/evaporation.

The natural resins (NR) of the present invention can be used as a substitute for some of the phenol in phenol/formaldehyde, phenol urea formaldehyde, and phenol melamine urea formaldehyde resins used as adhesives in the manufacture of wood products, or the NR can be used as a substitute of some of the phenol and some the formaldehyde components of phenol-containing formaldehyde resins, for example industrial phenol-formaldehyde resins. Furthermore, the NR of this invention can be used as a substitute within urea formaldehyde resins, and melamine urea formaldehyde, and related resins. The natural resins of the present invention can be used as a substitute for either some of the phenol component of a phenol-containing formaldehyde resin or for both the phenol and formaldehyde components of the resin, or as a substitute within urea formaldehyde type resins.

The natural resins of the present invention exhibit high reactivity due to the presence of a high number of active sites for binding and cross linking during polymerization.

According to the present invention there is provided a method of preparing a natural resin (NR) comprising:
 i) thermally converting a suitable biomass via rapid destructive distillation in order to produce vapours and char;
 ii) removing the char from the vapours;
 iii) recovering the vapours to produce a liquid pitch product;
 iv) processing the liquid product using distillation/evaporation to produce the NR.

The present invention embraces the above method, wherein the step of processing uses the liquid product obtained from a primary recovery unit, a secondary recovery unit, or a combination thereof.

This invention also pertains to the above method wherein the step of processing comprises the addition of water to the NR to produce an NR with reduced viscosity.

This invention relates to the above method wherein the step of processing comprises removing essentially all of the water content of the NR to produce a solid NR.

Furthermore, the present invention relates to the method as defined above wherein the step of processing comprises pretreating the liquid product prior to distillation/evaporation. Preferably, the step of pretreating comprises a water wash to reduce viscosity, improve flowability into downstream equipment and enhance the removal of non-resin components.

This invention is also directed to a natural resin (NR) characterized by comprising a water content up to about 20%, pH of about 2.0 to about 5.0, and acids content from about 0.1 to about 5 (dry wt %) and a viscosity of about 6 to about 130 cST (@70° C.) for liquid NR, or the NR may be solid NR.

This invention is also directed to a resin composition that comprises the NR as defined above. Furthermore, this invention is directed to a resin composition comprising NR from about 1% to about 40% (w/w) of the resin composition.

This invention is also directed to a resin composition as defined above comprising a phenol-containing or urea containing formaldehyde resin. Furthermore, this invention relates to a resin composition as defined above wherein the phenol-containing or urea-containing formaldehyde resin is selected from the group consisting of phenol formaldehyde, urea formaldehyde, phenol melamine urea formaldehyde, melamine urea formaldehyde, and phenol urea formaldehyde.

This invention also relates to a resin composition as defined above wherein the NR comprises from about 20 to about 40% (w/w) of the resin composition. Furthermore, the resin composition of this invention may further be characterized in that a portion of the formaldehyde, within the formaldehyde-phenol resin is replaced with NR, and wherein the NR replaces up to about 50% of the formaldehyde content of the resin. Preferably the adhesive composition comprises a formaldehyde:phenol ratio from about 1.2:1 to about 3:1. This invention is also directed to a resin composition wherein a portion of the phenol within a formaldehyde phenol resin is replaced with NR.

This invention also relates to mixtures of natural resin, comprising whole-oil and fractions of whole-oil.

Furthermore, this invention is directed to adhesive compositions and industrial resins comprising natural resin mixtures. This invention also includes phenol-containing formaldehyde resins comprising natural resin, or natural resin mixtures that replaces up to 100% of the phenol content of the phenol-containing resin.

This invention also embraces a wood product prepared using the adhesive compositions as defined above. Preferably, the wood product is selected from the group consisting of laminated wood, plywood, particle board, high density particle board, oriented strand board, medium density fiber board, hardboard or wafer board. Furthermore, the wood product prepared using the adhesive composition of this invention is used for exterior, interior or both interior and exterior applications.

This invention also pertains to industrial phenol formaldehyde resin products including mouldings, linings, insulation, foundry materials, brake linings, grit binders, for example to be used within abrasives such as sand paper, and the like.

Use of a fast pyrolysis process to produce the bio-oil is beneficial in that the fast pyrolysis process depolymerizes and homogenizes the natural glue component of wood, that being lignin, while at the same time other constituents are also depolymerized including cellulose and hemicellulose. The beneficial components are enhanced within NR following the step of distillation/evaporation The yield of NR, depending upon the biomass feedstock and the fraction of bio-oil used for NR preparation via distillation/evaporation, varies from 15–60% of the feedstock and exhibits properties that are useful within, for example, phenol-containing, or urea-containing formaldehyde resin compositions. The natural resin so produced can be substituted for some of the phenol and formaldehyde, content within phenol-containing formaldehyde resins, and such formulations meet or exceed current phenol formaldehyde resin industry specifications. Furthermore, NR can substitute for some of the formaldehyde within urea-containing formaldehyde resins. With removal of the organic acids, the NR can completely substitute for the phenol content in phenol resins, and can also be used within urea-containing formaldehyde resin formulations.

This summary of the invention does not necessarily describe all necessary features of the invention but that the invention may also reside in a sub-combination of the described features.

BRIEF DESCRIPTION OF THE DRAWINGS

These and other features of the invention will become more apparent from the following description in which reference is made to the appended drawings wherein:

FIG. 2 (A) is a schematic showing one of several possible methods for the production of NR60D-WH. FIG. 2 (B) shows one of several schematics for the production of NR80D-WH. 1° C. and 2° C. refer to the liquid products obtained from the primary and secondary recovery unit, respectively.

FIG. 5 shows an aspect of an embodiment of the present invention comprising a flow chart outlining the production of several natural resins. The schematic outlines the one of the possible methods for the production of NR60D-1H, NR60D-2H, and NR60D-WH. 1° C. and 2° C. refer to the liquid products obtained from the primary and secondary recovery unit, respectively.

DESCRIPTION OF PREFERRED EMBODIMENT

Figure 1:
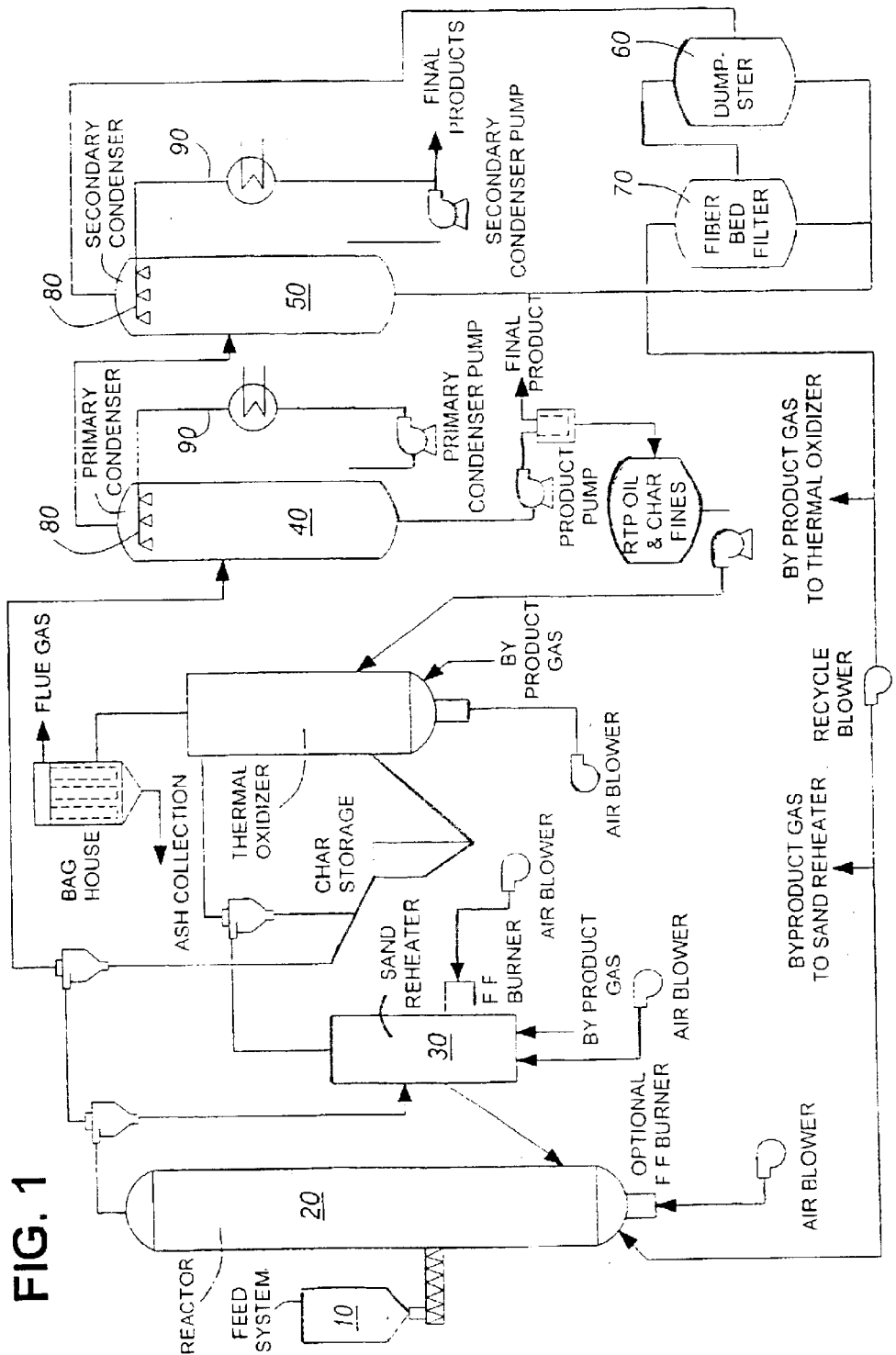
FIG. 1 shows a schematic of a rapid destructive distillation system, for example, which is not to be considered limiting in any manner, fast pyrolysis.
Figure 2A:
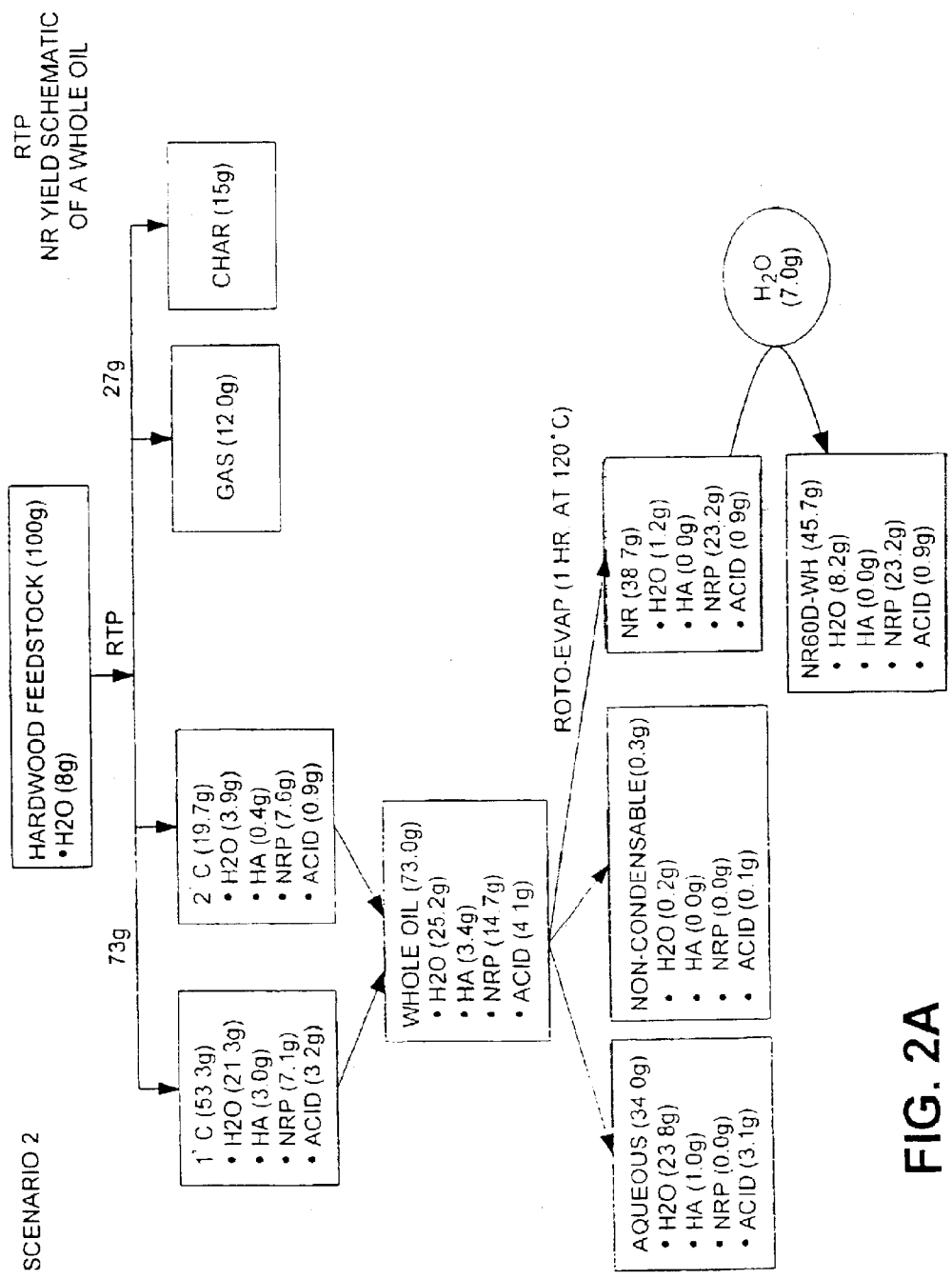
FIG. 2 shows an aspect of an embodiment of the present invention comprising a flow chart outlining the production of several natural resins.
Figure 2B:
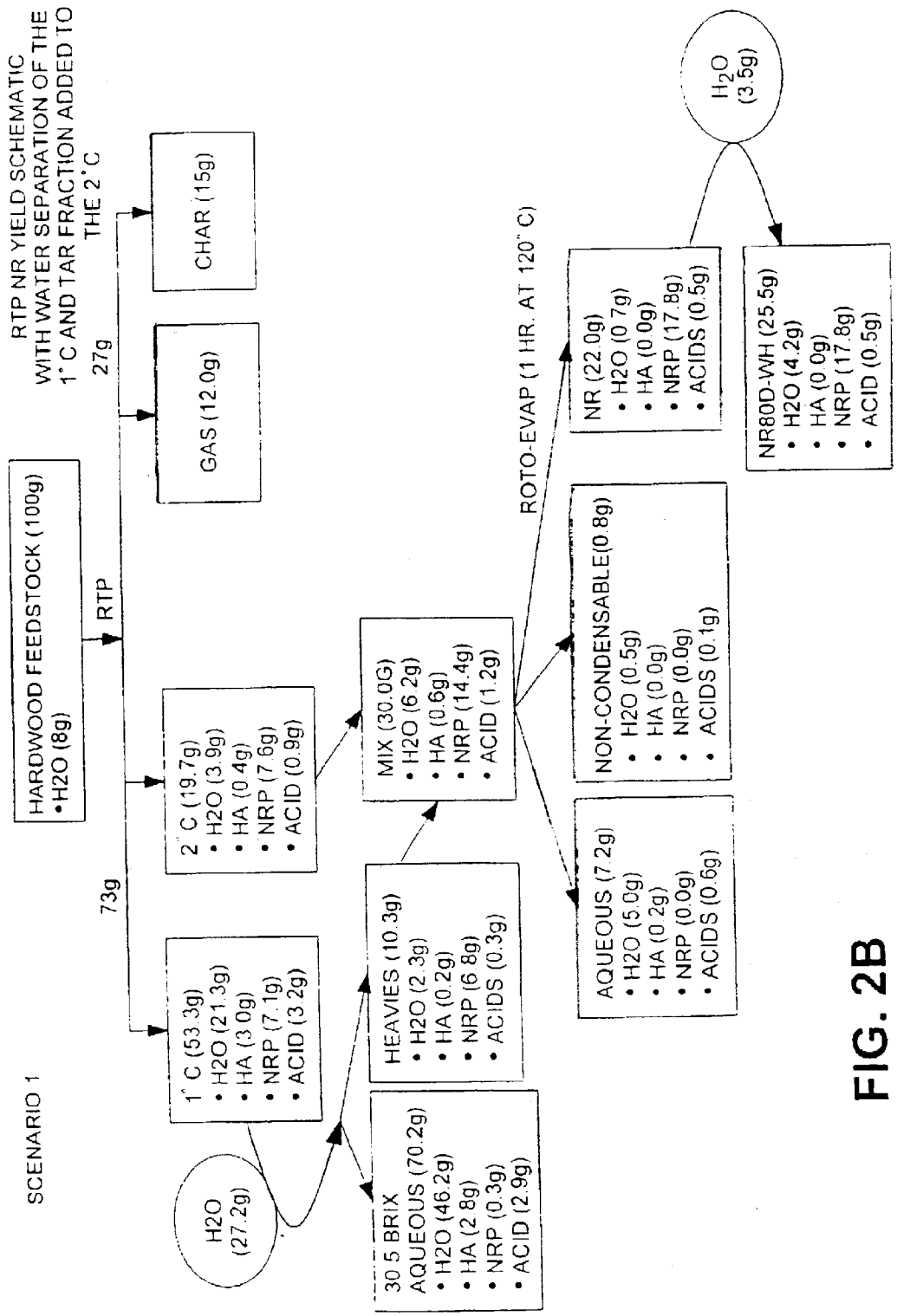
Figure 3:
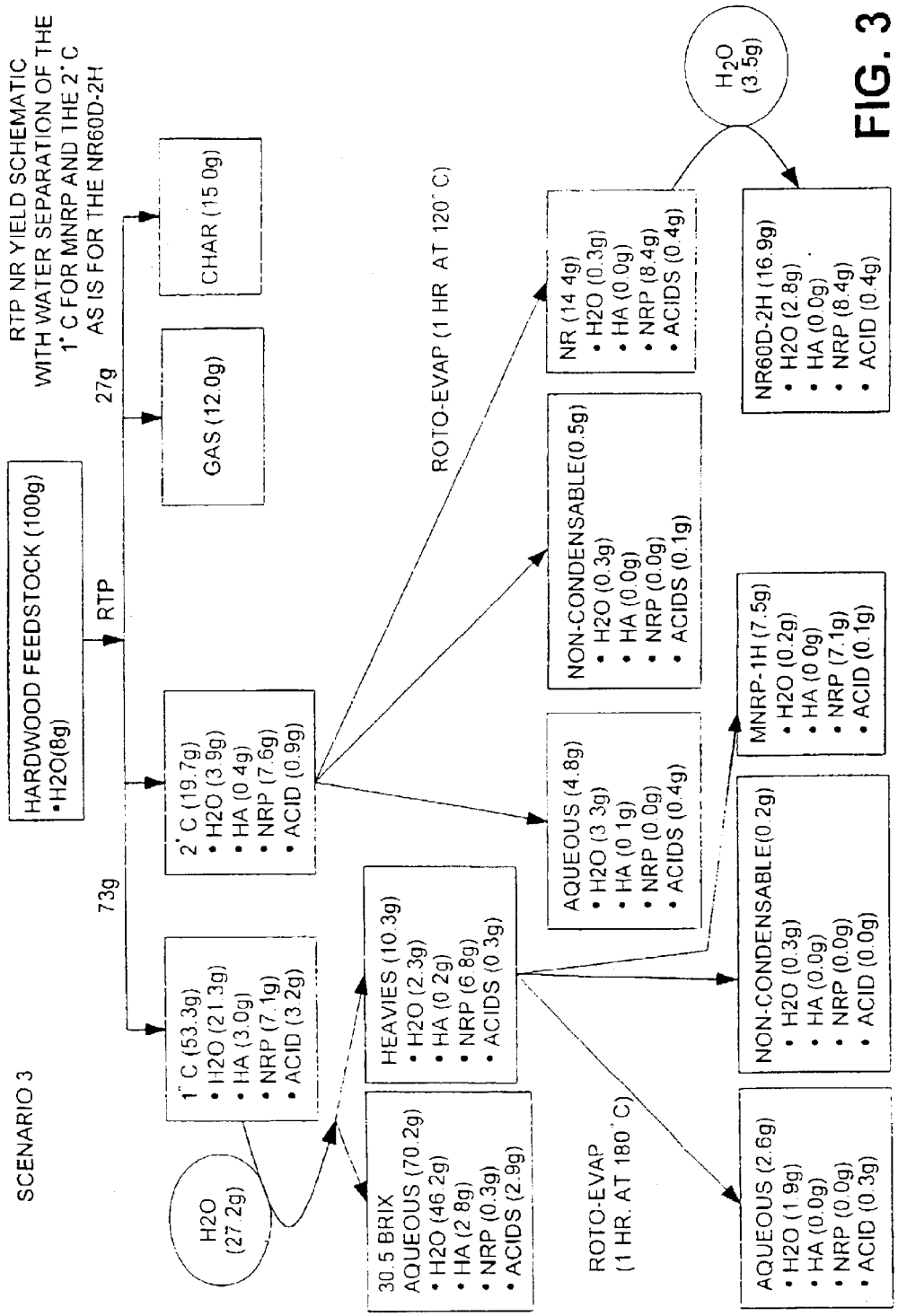
FIG. 3 shows an aspect of an embodiment of the present invention comprising a flow chart outlining the production of several natural resins. The schematic outlines the one of the possible methods for the production of MNRP-1H and NR60D-2H. 1° C. and 2° C. refer to the liquid products obtained from the primary and secondary recovery unit, respectively.
Figure 4:
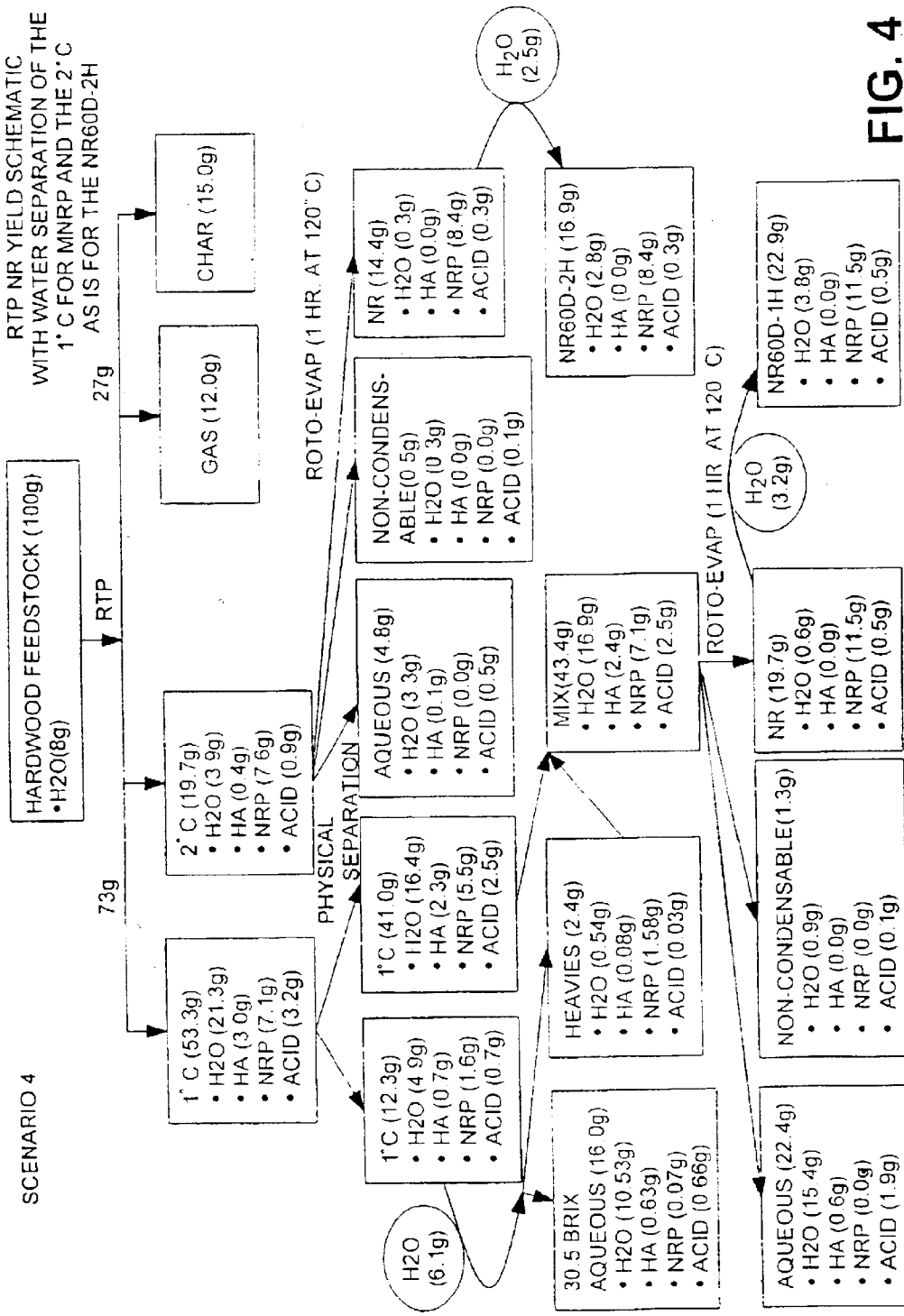
FIG. 4 shows an aspect of an embodiment of the present invention comprising a flow chart outlining the production of several natural resins. The schematic outlines the one of the possible methods for the production of NR60D-1H and NR60D-2H. 1° C. and 2° C. refer to the liquid products obtained from the primary and secondary recovery unit, respectively.

The present invention relates to the production and use of a natural resin, a highly reactive ligninic product, derived from wood bark and other biomass residues using rapid destructive distillation, for example, fast pyrolysis.

The following description is of a preferred embodiment by way of example only and without limitation to the combination of features necessary for carrying the invention into effect.

By "bio-oil", "whole-oil" or "light pitch" it is meant the whole liquid fraction obtained following rapid destructive distillation, for example fast pyrolysis, of wood or other biomass, including for example, softwood, hardwood, bark, or agricultural residues. Fast pyrolysis can be achieved by rapid heat transfer to the feed material, by rapid removal of the product via a vacuum, or by a combination of rapid heat transfer and pyrolysis under vacuum. The whole oil is obtained from the product vapour which is produced along with char following pyrolysis. Upon removal of the char the product vapour is condensed and collected within one or more recovery units, for example one or more condensers which may be linked in series. Whole-oil, bi-oil or light pitch refers to the combination of the condensed products obtained from all of the recovery units. Whole oil, or a fraction of the whole-oil which can obtained from at least one of the recovery units as described below, or a combination of whole oil and a selected product fraction, or a combination of different selected product fractions, may be used as a feedstock for further processing according to the methods of the present invention in order to produce a natural resin. By "oil feedstock", it is meant a whole-oil or light-pitch, or a selected product fraction of the whole oil or light pitch, or a combination thereof, that may be used for further processing as described herein.

By "selected product fraction", or "fraction of the whole oil" it is meant a fraction of the liquid product that is obtained from a product vapour following removal of char and condensation. For example, which is not to be considered limiting in any manner, the selected product fraction may comprise the liquid product obtained from at least one recovery unit, for example a primary recovery unit, a secondary recovery unit, or a combination thereof. The selected product fraction may be used as a feedstock for further processing in order to produce an NR of the present invention, or it may be combined with a whole-oil or another selected product fraction to produce an NR.

By "recovery unit" it is meant a device that collects product vapours produced during pyrolysis. A recovery unit may include, but is not limited to, a condenser means which cools and collects a liquid product from the product vapour as is known within the art. A recovery unit may also include de-misters, fiber filter beds or other devices used within the art to collect the liquid product from the product vapour. A recovery unit may comprise one or more components, for example, one or more condensers, which are typically linked in series.

By "distillation/evaporation" it is meant the processing of a whole-oil oir light pitch, or a selected product fraction, via non-destructive techniques in order to drive off water, acids, for example, but not limited to acetic acid, odorous and non-resin components or a combination thereof. The product of this step may be used as an NR, or it may be further processed, for example but not limited to, the addition of water, in order to produce an NR. The step of distillation/evaporation provides for a controlled polymerization of the feedstock and maintains reactive lignin sites in the product. Typically, the non-destructive techniques for distillation/evaporation include, but are not limited to:

evaporation, for example wipe film evaporation (W.F.E), roto-evaporation, agitated film evaporation, short tube vertical evaporation long tube horizontal evaporation, or other evaporation techniques known within the art;

distillation, for example, but not limited to vacuum distillation;

heat exchange, for example, but not limited to, falling film exchanger, scraped surface exchanger, or Teflon® heat exchanger;

water treatment, for example, but not limited to the addition of water, or a water-base solution comprising for example NaOH or KOH, at a temperature of from about 40° C. to about 60° C.;

or other physical or chemical process which removes, evaporates, isolates or otherwise drives off acids, volatiles, water and other light components which are less effective in terms of resin properties and which contain odorous components. Such techniques are known to one of skill in the art, see for example Perry's Chemical Engineers Handbook (6th Edition, R. H. Perry and D. Green eds, 1984; which is incorporated by reference).

Processing of the feedstock by distillation/evaporation can be controlled to produce an optimized degree of cross-linking or polymerization. With out intending to limit the present invention in any manner, NR can be prepared by heating the oil feedstock under vacuum to a temperature which is sufficient to devolatilize odorous and non-resin components. If a liquid NR is to be produced, the water content of the oil feedstock may monitored during distillation/evaporation to determine the degree of devolatilization so that a final water content of the intermediate liquid NR product is between about 1 and about 10 wt % is obtained. Preferably the final water content of the intermediate liquid NR product is between about 1 and about 5 wt %. The moisture content of the intermediate NR product is further adjusted to produce the final liquid NR product. For solid NR the water content is from about 1 to about 8 wt %, however, this NR is in a more polymerized state. The degree of polymerization may be controlled by the amount of heat used during distillation/evaporation, the amount of time the whole-oil or fraction thereof is subjected to the heat, or a combination thereof. Typically, the more heat or the longer the feedstock is subjected to the heat, or both more heat and longer exposure to heat, results in a more viscous product with a higher average molecular weight than the feedstock. Furthermore, it has been observed that the step of distillation/evaporation increases the proportion of phenolic-enhancer components within the NR.

The natural resin (NR) of this invention may comprise a whole-oil product that has undergone a controlled polymerization through distillation/evaporation, or it may include a selected product fraction of the whole liquid product that has been processed through distillation/evaporation, or it may include a combination of the whole-oil and selected product fraction that has been subjected to distillation/evaporation. NR includes both a liquid NR, for example NR60, as well as a solid NR, for example MNRP. Liquid NR's may span a range of viscosities and comprising a range of phenolic contents as described herein. Furthermore, the oil feedstock may be pretreated prior to the step of distillation/evaporation, and it may be further processed following distillation/evaporation.

The oil feedstock is preferably produced from the destructive distillation of wood, using for example, but not limited to fast pyrolysis. However, other processes that are able to liquefy wood may also be used to prepare an oil feedstock from which a NR may be obtained. Fast pyrolysis can be achieved by rapid heat transfer to the feed material, by rapid removal of the product via a vacuum, or by a combination of rapid heat transfer and pyrolysis under vacuum. The oil feedstock obtained from fast pyrolysis is primarily comprised of depolymerized lignin and other reactive components including phenolics which provide an array of active sites for binding and cross linking within the NR formulations of the present invention. Non-reactive components are removed during the preparation of the NR, including the distillation/evaporation of the whole-oil, selected product fraction, or a combination thereof, or other steps for pre-treating the oil feedstock, for example water washing (see below), prior to processing using distillation/evaporation. The isolated NR fraction is not typically subject to solvent or other fractionation processes used in the prior art, nor is it condensed (i.e. subject to condensation reactions) as would be typically done for conventional, or vacuum pyrolysis liquid products. Without wishing to be bound by theory, it is possible that the omission of such condensation reactions during the production of the NR of this invention is a primary reason for the high reactivity of NR as a resin agent. However, it is to be understood that the production of NR, described herein, may include one or more solvent extraction, or other concentration or purification steps as required.

By "MNRP" it is meant an NR that has had the acids, water and other non-reactive components removed via distillation/evaporation, or an other analogous process, to produce a solid NR product. MNRP may be ground, comminuted, and sized to a desired specification prior to use.

The NR of the present invention may be in the form of a liquid product, comprising activated lignin and spanning a range of viscosities from about 6 to about 130 cSt (@70° C.), for example, but not limited to NR60 (e.g.NR60D-1H, NR60D-2H, NR60D-WH), and NR80 (e.g. NR80D-1H, NR80D-2H, NR80D-WH), or it may be a solid NR lignin product, for example, but not limited to MNRP (e.g.MNRP-1H(70), MNRP-2H(70), MNRP-WH(70)) or "V-additive lignin". Various viscosities of NR may also be produced depending upon the temperature, duration and type of distillation/evaporation process used to produce NR. Liquid NR is characterized as being more polymerized, having a higher viscosity and a higher average molecular weight than the oil feedstock. Examples of schematics outlining the preparation of several NR's of the present invention are provided in FIGS. 2–5. With reference to these figures, it can readily be seen that various combinations and permutations for processing the various oil feedstocks and NR's produced from these feedstocks, may take place. Therefore, it is to be understood that the methods outlined in these figures are examples of several methods for producing NR, and are not to be considered limiting in any manner, as other NR's may be obtained by methods not disclosed within these figures.

NR is typically characterized by comprising a water content from about 2 to about 20%, pH of about 2.0 to about 5.0, and acids content from about 0.1 to about 5 (dry wt %) and a viscosity of about 6 to about 130 cST (@70° C.) for liquid NR, as in the case for example, but not limited to NR-60D, or the NR may be a solid NR as in the case of MNRP. Furthermore, NR is characterized as having an increased concentration of phenolics and enhancers, as indicated by its NRP Index from about 50 to about 100, over that of light pitch (whole-oil), having an NRP Index of about 23 to about 30 (see Tables 3a and 3b, Example 2). NR is also characterized as having a higher average molecular weight (AMW), when compared to light-pitch. For example, NR-60D-WH has a wet AMW of about 306, and a dry AMW of about 363, while light-pitch is characterized as having a wet AMV of about 232 and a dry AMW of about 299. MNRP has an even higher AMV of about 388 (wet) and about 412 (dry). The total phenolic content of NR, for example, but not limited to NR60D-2H is from about 40 to about 45% wt, and greater than that of whole-oil, from about 30% wt to about 35% wt (See Table 3c, Example 2). The total phenolic content of MNRP is greater than that of NR60D-2H.

A highly polymerized NR, called V-additive lignin is further characterized as having a high phenolic content of about 95%, a water content of about 3%, and a melting point from about 110° C. to about 150° C. (see Table 3d Example 2). This NR is a thermoplastic product and is suitable for use within industrial applications, for example as a plasticizer that can be used within foundry resin formulations as a binder for cores or admixed with moulding sand or clays, as an asphalt emulsifier, or as a concrete additive to increase the aeration quality of concrete.

NR is more reactive, and comprises less acid and other odorous components than the oil feedstock. The removal of acids ensures the maintenance of optimal resin properties upon rehydration, if required, and during the use of NR as an adhesive. Furthermore, a lower content of acids requires less addition of caustic during adhesive formulation which otherwise weakens the wet property of the adhesive. V-additive lignin also has properties that make it suitable for a range of different industrial applications for example as a foundry resin, concrete additive, or asphalt emulsifier. NR obtained following distillation/evaporation comprises a complex mixture of enhancer compounds, for example, but not limited to, aldehydes and ketones, and active phenolic compounds comprised of monomers and oligomers. NR therefore has the ability to co-react with, or be used as a substitute for, phenol within phenol/formaldehyde (PF) resins.

By "phenolics" or "ligninic" it is meant phenolic polymers which retain the essential characteristics of their natural precursors (natural lignin is a phenolic polymer which holds wood and bark fibres together and which gives wood its strength), but are activated for use in resin formulations, or as additives in other industrial applications.

By "enhancers" it is meant carbonyl compounds, typically light aldehydes and ketones.

The NR-containing resins of the present invention may be used in the same manner as phenol-formaldehyde resins are typically used. For example, which is not to be considered limiting in any manner, resins compositions comprising NR may be used to produce industrial phenol formaldehyde resin products including mouldings, linings, insulation, foundry materials, brake linings, grit binders, for example, those used with abrasives such as sand paper, and the like. Furthermore, NR comprising resins may be used as adhesives for the product of wood products and the like.

Fast pyrolysis of wood or other biomass residues results in the preparation of product vapours and char. After removal of the char components from the product stream, the product vapours are condensed to obtain a whole-oil, or bio-oil product from pyrolysis. A suitable fast pyrolysis process for preparing such a bio-oil is described in WO 91/11499 (Freel and Graham, published Aug. 8, 1991, which is incorporated by reference), and is diagrammatically presented in FIG. 1. Briefly, the system includes a feed system (10), a reactor (20), a particulate inorganic heat carrier reheating system (30), and for the purposes of the invention described herein, at least one recovery unit, which as shown in FIG. 1, and which is not to be considered limiting in any manner, may comprise a primary (40) and a secondary (50) condenser through which the product vapours produced during pyrolysis are cooled and collected using a suitable condenser means (80). The recovery unit may also include, a de-mister (60) and a fiber filter bed (70) or other device to collect the liquid product. The NR of this invention may be derived from a selected product fraction obtained from at least one recovery unit, for example the primary, or the secondary recovery unit, or a combination thereof, or it may be a whole-oil, obtained from first and second recovery units, including de-misters and fiber filter bed, or a combination thereof. However, it is to be understood that analogous fast pyrolysis systems, comprising different number or size of recovery units, or different condensing means may be used for the selective preparation of the oil feedstock for the purpose of the present invention.

The recovery unit system used within the fast pyrolysis reactor system, outlined in FIG. 1, which is not to be considered limiting in any manner, involves the use of direct-liquid contact condensers (80) to cool the pyrolytic oil product. However, it is to be understood that any suitable recovery unit may be used. In the preferred embodiment, liquid, used within these condensers (80) to cool the pyrolytic product, is obtained from the corresponding cooled primary or secondary condenser product (90; FIG. 1). However, as would be evident to one of skill in the art, any other compatible liquid for cooling the product within the primary and secondary recovery units, or a combination thereof, may also be used for this purpose. Furthermore, it is considered within the scope of this invention that other scrubber or cooling means including heat exchanges comprising solid surfaces and the like may also be used for cooling the product vapours. Bio-oils of the prior art may be processed using. the methods of the present invention to produce a NR suitable for use within adhesive formulations.

Suitable oil feedstocks for the purposes of the present invention may be produced using the method and apparatus disclosed in WO 91/11499 (which is incorporated by reference). These oil feedstocks are typically characterized by the properties outlined in Example 1, however, it is to be understood that the properties defined in Example 1 vary depending upon the lignocellulosic feedstock used for fast pyrolysis. Other oil feedstocks, comprising different properties than those listed in Example 1 may be used for the methods as described herein.

An example, which is not to be considered limiting in any manner, of conditions of distillation/evaporation for producing a liquid NR obtained from whole-oil, a selected product fraction, or a combination thereof, comprises processing the oil feedstock at about 60° C. to about 200° for about 1 to about 3 hours via roto-evaporation Preferably, the oil feedstock is maintained at about 110° C. to about 130° C. for about 1 to about 1.5 hours during this processing step. Similar temperature ranges may be used to prepare a liquid NR using W.F.E., however, the duration of time where the oil feedstock is present within the W.F.E. apparatus is much shorter (i.e. the transport time through the apparatus), and the oil feedstock can be processed in a continuous and rapid manner. Typically following the distillation/evaporation step, and while the NR is still at about 60° C. to about 110° C., water may be added to the NR to reduce the viscosity to the desired specification. The final liquid NR product so produced is characterized with a viscosity ranging from about 6.0 to about 130 (cSt @ 70° C.), and comprises a water content level of from about 10 to about 25 wt %, preferably, the water content is from about 15 to about 18%. One example of a liquid NR produced using roto-evaporation, is NR60D-2H, which when subjected to roto-evaporation for 1 hour at 120° C. and rehydrated, is characterized as having a viscosity of about 70 cSt.(@ 70° C.), a pH of about 2.6 and a low acid content of about 2.4 (Dry wt %). However, it is to be understood that by varying the oil feedstock and distillation/evaporation processing parameters a variety of liquid NR's may be produced.

An example, which is not to be considered limiting in any manner, of conditions of distillation/evaporation for producing an MNRP (solid NR) obtained from whole-oil, a selected product fraction, or a combination thereof, comprises processing the oil feedstock to roto-evaporation at about 125° C. to about 220° C. for about 1 to about 3 hours. Preferably, the oil feedstock is maintained at about 160° C. to about 200° C. for about 1 to about 1.5 hours. Temperature ranges of from about 90° C. to about 160° C. may be used with W.F.E in order to process oil feedstock in a batch or continuous manner. An example of a solid NR produced in this manner, is MNRP-1H(70), which may be produced by roto-evaporation for 1 hour at 180° C. Typically, after cooling, the MNRP is ground and sized to produce a powder as a final product. A variety of solid NR products may be prepared by varying the feedstock, and processing parameters, including V-additive lignin.

The viscosity and degree of polymerization of liquid NR may also be varied by pretreating a selected product fraction, prior to the step of distillation/evaporation. For example, which is not to be considered limiting, an NR with increased viscosity and degree of polymerization over that of the oil feedstock may be obtained by subjecting a selected product fraction obtained from the first recovery unit to a water wash, prior to distillation/evaporation, or prior to mixing it with a selected product fraction obtained from the second recovery unit and then proceeding with the step of distillation/evaporation as outlined above. Typically, water at about 30° C. to about 80° C., preferably from about 40° C. to about 60° C., is added to the oil and mixed together, and the ligninic NR liquid is allowed to concentrate. The non-ligninic liquid comprises acids and other water-soluble components that reduce the reactivity of the final liquid or solid NR product. Separation and recovery of the non-ligninic liquid concentrates the ligninic oil product. Furthermore, the addition of water to the oil feedstock prior to distillation/evaporation helps in the transfer of the oil feedstock during processing. Water addition also helps to prevent the overcooking of the oil during distillati on/evaporation, and it may help enhance the removal of non-resin components from the oil during distillation/evaporation by providing a carrier for such components. An example, which is not to be considered limiting in any manner, of a washed oil feedstock that is then processed by distillation/evaporation is NR80D-2H.

Therefore the final characteristics of NR may span a range of viscosities and degrees of polymerization as determined by:

varying the temperature and treatment time during distillation/evaporation;

the type of lignocellulosic feedstock used to produce the oil feedstock, for example but not limited to oil feedstock produced by fast pyrolysis;

the oil feedstock itself, whether it is a whole-oil, or a selected product fraction, or a combination thereof;

the pretreatment of the oil feedstock; and the amount of water added back to liquid NR.

Therefore, the present invention provides for a range of NR's, with a range of properties, including the degree of cross-linking, polymerization, enhancers, and active phenolic compounds, that may be used as replacements of constituents within adhesive resins, such as phenol formaldehyde, urea formaldehyde, or related resins, or as an asphalt emulsifier, concrete additive, foundry binder, as defined above.

By "phenol-containing formaldehyde resin" it is meant resin compositions that comprises phenol as one of its ingredients. Such resins include but are not limited to phenol formaldehyde (PF), phenolic melamine urea formaldehyde (PMUF), and phenol urea formaldehyde (PUF) resins. Similarly, by "urea-containing formaldehyde resins" it is meant adhesive compositions comprising urea as one of its ingredients, for example, but not limited to, urea formaldehyde (UF), phenol urea formaldehyde (PUF), phenol melamine urea formaldehyde (PMUF), and melamine urea formaldehyde (MUF) resins. Without wishing to be bound by theory, it is thought that the addition of NR (in either solid or liquid form) to urea-containing resins adds or complements the phenol content of these resins due to the high phenolic content of NR. Therefore, a UF resin that is partially replaced with NR may be considered a PUF-like resin.

Without wishing to be bound by theory, it is thought that the processing of the oil-feedstock using distillation/evaporation removes compounds that interfere with the use of bio-oils, for example those found within the prior art, within adhesive resin formulations. Furthermore, the distillation/evaporation process has been found to actually increase the ligninic and enhancer properties within the final NR product, over that found within the oil feedstock. As a result NR is comprised of a predominantly phenolic fraction, containing aldehydes, which provide NR with its desirable properties for use within adhesive formulations. In part this quality of NR is indicated by its NRP (Natural Resin Pure) Index. For example, whole oil has an NRP Index of about 29, NR-60D has an NRP Index of about 60, and MNRP is characterized with an NRP Index of about 90.

The oil feedstock of this invention may also be pretreated to reduce the organic acid content of the resin prior to distillation/evaporation. Any suitable method may be employed for this process, for example, and not wishing to be limited to this method, the feedstock may be washed in water by mixing the feedstock in water, allowing phase separation to take place, and recovering the oil fraction. For example, which is not to be considered limiting in any manner, the oil feedstock is washed in water from about 30°

C. to about 80° C. and left to precipitate. Preferably, the water temperature is from about 40° C. to about 60° C. The pretreated feedstock prepared in this manner, comprises the phenolic and aldehyde content of the feedstock, with a dramatically reduced organic acid content when compared with the initial feedstock, and is a more concentrate form of feedstock, containing up to about 80% (w/w) phenolics. This pretreated feedstock may be used for the preparation of NR or MNRP as described herein, for example, but not limited to NR80D-2H.

The NR, or MNRP produced by the method described herein have been substituted for some of the phenol content within PF resins, and such formulations meet or exceed current PF resin industry specifications. NR has been substituted from about 60% to about 100% of the phenol content within PF resins. Resins so produced may comprise up to about 40% (w/w) of NR. Similarly, NR may also be used as replacement within PMUF and, PUF resins. Furthermore, the NR of this invention has successfully replaced up to about 60% (w/w) of the urea formaldehyde within UF resins, and has been effectively used within PMUF and MUF resins. MNRP resins with even higher melting point temperatures, for example above 110° C. may also be prepared using the methods as described herein. These high melting point resins are referred to as V-additive lignins and has use within the automotive industry, or as a foundry resin, asphalt emulsifier, or as a concrete additive (see Table 3d, Example 2).

As a result of processing the NR using distillation/evaporation, the recovery technique is more selective than solvent extraction-based methods. For example, the P/N fraction extracted using ethyl acetate (e.g. U.S. Pat. Nos. 4,942,269; 5,235,021), results in a fraction comprising a compound that is soluble in this solvent and that is co-extracted along with the desired-for resin compounds. Several of these co-extracted compounds are odorous (e.g. lactone, an acrid compound) while others dilute the P/N resin. The distillation/evaporation technique of this invention is selective in that essentially all of the desirable resin components (natural phenolics derived from lignin) are recovered, while other non-desired compounds are removed within other fractions. Furthermore, the process of distillation/evaporation has been found to increase the phenolic and enhancer components within NR, when compared to the oil feedstock. As a result, the NR of this invention exhibits many beneficial properties over prior art pyrolytic oil extractions and requires significantly less preparation. For example:

1. NR and MNRP have a slight pleasant "smoky" odour, lacking the acrid smell of solvent extracted fractions. When used within adhesive applications and industrial resin applications, there is no residual odour,
2. in solvent extracted processes, including the process used to obtain P/N, the solvent reacts with residuals in the fraction that is not used for P/N, to form salts. These salts must be recovered using a recovery boiler requiring additional costs, and the residual bio-oil is not available for other commercial applications. NR or MNRP products, on the other hand, are not contaminated with salts as no solvents are used;
3. the processing of oil feedstock by distillation/evaporation is readily accomplished using simple devices and does not require any specialized facilities for handling solvents and the like;
4. the fast pyrolysis method used for the preparation of bio-oil, including NR, has been successfully scaled up from bench-top trials to industrial/commercial production levels (see WO91/11499). Therefore, NR preparations are easily produced on a commercial scale.

Characteristics of NR

The NR produced by the method of this invention has been found to be consistent between batch to batch productions runs of NR (as tested when used for OSB production, see below), even when different hardwoods and softwoods are processed by fast pyrolysis.

The free phenol content of a resin formulations is also used to determine the suitability of alternative materials in PF resin formulations. The NR produced following the method of this invention is characterised in having a very low free phenol content, from about 0.001 to about 0.05% (w/w), yet the total phenolic content is quite high, from about 30% to about 80% (w/w) within NR. It is the phenolic content which is very reactive and provides an array of active sites for binding and cross linking within NR formulations.

NR refers to a range of products that are prepared according to the methods of the present invention. Several examples of such products include, but are not limited to:

NR60D-WH
NR60D-1H
NR60D-2H
NR80D-2H
MNRP-1H(70)
MNRP-2H(70)
V-additive lignin.

Also see FIGS. 2–5

The above nomenclature is to be interpreted as follows: NR60D-WH, is a liquid NR with an Natural Resin Pure Index (NRP) of 60. The NRP index is a measure of the phenolic and enhancer content of the NR. A higher NRP index indicates a greater proportion of phenolics and enhancers. The "D" associated with NR60, indicates that the NR has been processed by distillation/evaporation (MNRP due to its nature has been processed using distillation/evaporation, and therefore lacks the "D" designation). The oil feedstock for the preparation of the NR may be a whole-oil obtained from a range of lignocellulosic feedstocks, for example hardwood, and "WH" designates such a oil feedstock. The 1H or 2H designation indicates that the oil feedstock is obtained from the primary or secondary recovery unit, respectively, using a hardwood lignocellulosic feedstock (other lignocellulosic feedstocks may also be used). MNRP indicates that the NR is solid. The 1H or 2H designation is the same as above, while "(70)" indicates that the melting point of the M is 70° C. V-additive lignin is a highly polymerized MNRP characterized in that it has a melting point above 110° C.

Several of these NR's are characterized by the parameters listed in Example 2 however, it is to be understood that other NR may be produced with properties that differ from those listed in Example 2.

The final NR product of this invention comprises up to about 20% water, however, NR is insoluble in water due to its low polarity and high content of non-polar organics. By increasing the pH of the NR (to about 10) and converting it into its phenoxide ion form it obtains a gum-like consistency, is water soluble and can be used within formaldehyde-phenol formulations. MNRP is not soluble in water and is used in its powdered form within adhesive formulations. NR, both solid and liquid, is soluble in polar organic solvents for example acetone, methanol, ethanol and isopropanol. Due to the hydrophobicity of NR, it is chemically compatible in the formulation of phenolic-based resins. Liquid NR is soluble in a mixture of water/phenol, and when reacted with formaldehyde, gives methyol-water soluble derivatives. Liquid NR (for example NR60) and solid NR (for example MNRP) are both soluble in the basic formulation of a P/F When compared with whole-oil, NR is typically characterized by comprising a lower water and acid content, a higher viscosity, NRP Index and average molecular weight than whole oil. For example, which is not to be considered limiting in any manner, a comparison of NR60D-2H with whole-oil indicates that NR60D-2H comprises:

- a lower water content (from about 5 to about 20 wt %), than that of whole-oil (about 23–30 wt %);
- a lower acid content of about 0.1 to about 5 dry wt %, compared with an acid content of about 7 to about 12 dry wt % of whole oil;
- a viscosity of about 20 to about 130 cST (@70° C.), compared with a viscosity of whole oil of about 5 to about 10 cST (@70° C.);
- an increased concentration of phenolics and enhancers (NRP Index from about 50 to about 100), compared with whole-oil having an NRP Index of about 23 to about 30;
- a higher average molecular weight (wet—about 306; dry about 363) compared to whole oil (wet—about 232; dry about 299); and
- a total phenolic content from about 40 wt % to about 45 wt %, compared with that of whole-oil, from about 30 wt % to about 35 wt %.

A higly polymerized NR with a high melting point typically about 110° C. is called V-additive lignin. This NR is produced by increasing the time, temperature, or both time and temperature during distillation/evaporation. V-additive lignin is characterized as having a high phenlic contect of about 95%, a water content of about 3%, a melting point from about 110° C. to about 150° C., a flash point greater than 280° C., and a density of about 25C g/cm(see Table 3d Example 2). V-additive lignin may be commuted to a powder or produced in a flake-like form prior to use. This NR is a thermoplastic product and is suitable for use within industrial applications, for example as a plasticizer that can be used within foundry resin formulations and admixed with sand, as an asphalt emulsifier, or as a concrete additive to increase the aeration quality of concrete. V-additive lignin may also be used within the automotive industry.

Calometric analysis indicates that NR has a net caloric value of about 4355 cal/g (18.22 MJ/kg), with a gros caloric value of about 4690 cal/g (19.62 MJ/kg).

NR may be obtained from a variety of lignocellulosic feedstock sources including softwood, hardwood, bark, white wood, or other lignocellulosic biomass feedstocks, for example, bagasse (sugar cane residue).

NR-containing Phenol Formaldehyde (PF), or Urea Formaldehyde (UF) Resins

In order to formulate NR within phenol-containing formaldehyde, or urea-containing formaldehyde resins, phenol or urea, water, paraformaldehyde, and other ingredients of the adhesive are mixed together and heated if required to dissolve the ingredients. If heated, the mixture is cooled prior to the addition of NR. Caustic (for example NaOH) is added to the mixture containing phenol or urea, formaldehyde and NR, to a desired pH. The addition of caustic ensures the solubilization of the NR, and initiates the reaction. This mixture may then be heated or cooled, and more caustic added during the preparation of the resin, as required. The resin is typically maintained at 10° C. until use, and exhibits similar stability associated with commercial PF resin formulations. Phenolic melamine urea formaldehyde (PMUF), melamine urea formaldehyde (MUF), phenol urea formaldehyde (PUF) resins are prepared in a similar manner.

NR can be added up to about 60% to about 100% (w/w) of the phenol content of the resin. Furthermore, the formaldehyde content of phenol-containing or urea-containing resins may be substituted with NR due to the natural aldehydes present within NR, for example NR can be used to replace up to about 50% (w/w) of the formaldehyde content of these resins. Similarly, up to about 60% (w/w) of the urea-formaldehyde content of a UF resin may be replaced using NR. Therefore, PF, UF and related resins may be formulated that contain up to about 40% (w/w) NR of the total resin composition. As disclosed in Example 3, NR produced as described herein is suitable for use as a phenol substitute within PF resins. However, this is not the case for Whole-oil (light pitch), which when used within PF resins as a substitute for 40% phenol, produced inferior OSB and waferboard panels (see Example 3, Table 5) that did not meet CSA Standard 0437.093.

Resins prepared using NR may be used for a variety of purposes including, but not limited to, the preparation of wood products, for example, laminated wood, plywood, particle board, high density particle board, oriented strand board, medium density fibre board, hardboard, or wafer board. Furthermore, NR-containing resins may also be used for the manufacture of industrial phenol formaldehyde resin products, for example, but not limited to, mouldings, linings, insulation, as foundry resins, asphalt emulsifiers, concrete additives, for brake linings, as grit binders and the like.

Board Manufacture Using NR-containing Resins

The phenol-containing or urea-containing formaldehyde resins prepared above may be used for the production of a range of board products, for example, but not limited to, laminate wood boards, plywood, particle board, high density particle board, oriented strand board, medium density fiber board, hardboard, or wafer board. NR-containing PF resins are used within boards to be subject to exterior use due to the excellent water repellency of the resin. Typically UF resins are not desired for outside use, however, NR-containing UF resins may have application for exterior use due to the reduced swelling observed in boards prepared with urea formaldehyde adhesives comprising NR, compared with boards prepared using commercial UF resin.

NR containing PF or UF resins can be used for the production of oriented strand board (OSB) as outlined below. However, it is to be understood that this application of NR-containing resin is not to be considered limiting in any manner, as other wood derived products prepared using commercially available PF, UF, or related resins, which are commonly known within the art, may be prepared using resin formulations comprising NR.

Oriented strand boards may prepared using standards methods that are known to those of skill in the art. For example, but not to be considered limiting in any manner, the production of OSB may involve the following parameters:

wood matrix: particulate wood product, wood chips, wafers, veneer or plywood etc.
Panel thickness: from about 1/16" to 2"
Resin content: from about 0.5 to about 20.0%
Wax content: from about 0.5 to about 5%
Mat moisture: from about 2 to about 10%
Press time: from about 2 min to 30 min
Press temperature: from about 150° C. to about 275° C.

It is to be understood that these parameters may be adjusted as required in order to produce a suitable board product using NR-containing resins of this invention.

Oriented strand boards, or other board types, as listed above, that are prepared using NR-containing PF resins are readily tested for suitability within the industry. For example, the OSB boards prepared as described herein have been tested according to the Canadian product standard for OSB (CSA 0437.1-93, April 1993). These tests include; determination of density, internal bond (IB), modulus of rupture (MOR), and modulus of elasticity (MOE) and the minimum properties to meet this standard are listed below (Table 1):

TABLE 1

CSA 0437.103 Standard

| Parameter | Grade R-1 | Units |
|---|---|---|
| Modulus of Rupture (MOR) | 17.2 | MPa |
| Modulus of Elasticity (MOE) | 3100 | MPa |
| MOR after 2-h boil (wet) | 8.6 | MPa |
| Internal Bond (IB) | 0.345 | MPa |
| Thickness Swell | 15 | % |
| Water Adsorption | N/A | % |

Results of these tests indicate that phenol may be replaced by NR from about 10 up to 100% (w/w), and produce a OSB product that meets industrial standards, and that is equivalent to, or exceeds OSBs prepared using commercially available phenol-containing, or urea-containing formaldehyde resins. Furthermore, OSB boards prepared with NR-containing resins require less formaldehyde within resin formulations for equivalent cross-linking and binding properties as typically found with control resin formulations.

Without wishing to be bound by theory, it is thought that the natural carbonyl components (such as aldehydes and ketones) within NR permits the use of less formaldehyde. In applications which require lower strength adhesive, the NR can be used alone without any addition of formaldehyde, but it is preferable to add formaldehyde to obtain a better resin. These carbonyl compounds have a molecular weight from about 30 to about 800 Daltons, and comprise about 23% of the NR The NR produced following the method of this invention has a dark brown colour, and when formulated into a resin, results in a dark reddish brown colour. However, during production runs using NR, OSB boards are lighter in colour than PF control boards. Furthermore, the NR has a mild, pleasant odour, yet OSB boards prepared using NR have no resultant odour. The odour can be reduced following heating of the NR, or through the removal of volatiles via flushing. The NR of this invention is also characterized by being acidic (pH ~2.3), however, the acid content of NR is substantially reduced compared with that of the oil feedstock.

The above description is not intended to limit the claimed invention in any manner, furthermore, the discussed combination of features might not be absolutely necessary for the inventive solution.

The present invention will be further illustrated in the following examples. However it is to be understood that these examples are for illustrative purposes only, and should not be used to limit the scope of the present invention in any manner.

EXAMPLES

Example 1

Method for Obtaining, and the Characteristics of, Oil Feedstocks

Oil feedstock is obtained using red maple feedstock within a fast pyrolysis reactor as described in WO 91/11499 (which is incorporated herein by reference). Red maple feedstock is supplied to the reactor at a feedstock to heat carrier ratio of from about 5:1 to about 200:1. The char is rapidly separated from the product vapour/gas stream, and the product vapour rapidly quenched within the primary recovery unit using, for example, a direct liquid contact condenser. The compounds remaining within the product vapour are transferred to a secondary recovery unit linked to the primary recovery unit in series. The product vapour is then quenched using, for example a direct-liquid contact condenser within the secondary recovery unit, and the condensed product collected. Any remaining product within the product vapour is collected within the demister and filter bed (see FIG. 1). The primary recovery unit product is collected, as well as the secondary recovery unit product. The yield of product oil, using red maple as a feedstock, from the primary recovery unit ranges from about 40 to about 60% (w/w), and is typically about 53.3%. The yield of oil from the secondary recovery unit ranges from about 12 to about 25% (w/w) and is typically about 19.7%.

The oil feedstock is characterized as exhibiting a low free phenol content ranging from 0.001 to 0.1% (w/w); total phenolic content from about 10–80% (w/w); a dark brown colour and a mild, pleasant smoky odour, a pH of about 2.0 to about 2.8 (see Table 2); insolubility in water, and solubility in organic solvents including acetone, methanol, ethanol and isopropanol.

TABLE 2

Properties of Oil feedstock

| Oil feedstock | pH | Water content (wt %) | Acid Content (Dry wt %) | Viscosity (cSt @ 70° C. | NRP Index | A.M.W.* Wet/Dry |
|---|---|---|---|---|---|---|
| Primary Recovery unit | 2 | 36 | 12 | 3 | 22 | n/d*** |
| Secondary Recovery unit | 2 | 18 | 8 | 15 | 48 | n/d |
| Whole-oil** | 2 | 24 | 10 | 6 | 30 | 232/299 |

*Average Molecular Weight
**combination of primary and secondary recovery unit oil-products.
***not determined The oil feedstock is optionally washed with 3 volumes water at 50° C., the phases allowed to separate, and the oil-layer retained, to produce a washed oil feedstock that is characterized in having a more neutral pH, and up to 90% less organic acid content when compared with the oil feedstock. Furthermore, the phenolic content of washed oil feedstock is up to about 80% (w/w) or more, due to the removal of the organic acid component, and is a more concentrate form of oil feedstock.

Example 2

Preparation and Analysis of Liquid NR, MNRP and V-additive Lignin

Liquid NR Production Using Rotoevaporation

Oil feedstocks from Example 1 are processed by distillation/evaporation at 120° C. for 1 hour under vacuum of 26"Hg to a water content of about 3% (wt %) to produce an NR. The product is removed and water is added to the liquid NR when the NR reaches a temperature of about 80° C. to make a final water content of 16–18 (wt %). The NR is mixed well and allowed to cool to room temperature.

Liquid NR is typically characterized by comprising a water content of from about 10 to about 20 wt %, pH of about 2.0 to about 5.0, an acids content from about 0.1 to about 5 (dry wt %), an average molecular weight (wet)/(dry) of from about (250–350)/(280–380) Daltons, and a viscosity of about 6 to about 130 cST (@70° C.). Analysis of liquid NR is presented in Tables 2 and 3 below.

Solid MNRP Production Using Rotoevaporation

Oil feedstocks from Example 1 are processed by distillation/evaporation at 180° C. for 1 hour under vacuum of 26"Hg. The product is decanted while hot, cooled to solidify, and ground to a powder. To produce an MNRP with an 80° C. or a 100° C. melting point, the oil feedstock is rotoevaporated for 1 hour 10 min, or 1 hour 20 min, respectively.

Solid NR is characterized by comprising a water content of from about 3 to about 10 wt %, pH of about 2.0 to about 5.0, an acids content from about 0.1 to about 5 (dry wt %), an average molecular weight (wet)/(dry) of from about (300–450)/(350–500) Daltons, and is a solid at room temperature.

Examples of the properties of several solid NR's prepared from primary, secondary recovery units are presented in Table 3. These parameters are typical for each defined sample, however, they are obtained from one sample and variations in these values are to be expected.

Both the liquid and solid NR's are generally characterized as having a lower acid content, higher pH, higher viscosity, an increased average molecular weight, and a higher concentration of phenolics and enhancers as indicated by the NRP Index, than the oil feedstock (compare Tables 2, above and Table 3, below).

Wiped Film Evaporation of NR

Oil feedstocks from Example 1 are processed by WFE at 80° C., for liquid NR, or 140° C. for MNRP, in a continuous or batch mode under vacuum of 26"Hg. The oil feedstock is added to the WFE at a feed rate within a range of 20 to 50 lbs./hr per square foot of heated surface area. Once liquid is observed flowing through the viewing port on the resin outlet of the WFE, the rotor is turned on between 130 and 300 revolutions per minute. The liquid is distributed centrifugally to the heated wall and a film is created by the moving wiper blades. All pipes used to transport the NR are heated to 150° C. The concentrated resin is tapped off after an appropriate amount of time.

Batch System

Vacuum is isolated with top valve of resin vessel and resin is drained into a container. When all resin has drained, the drain valve is closed and the vacuum is reintroduced to vessel. The concentrated resin is weighed, and for liquid NR, an appropriate amount of water to produce a product with 16% to 18% by weight is added. The product is mixed thoroughly with drill mixer and a sample is taken for analysis. No water is added for MNRP (solid NR).

Continuous System

A height for the level setpoint is set and the bleed line control valve is adjusted to the mixing tank to keep this level constant. For liquid NR, the water flow rate setpoint is set to a value that produces a product with a water content of 16% to 18%. A high shear mixer mounted on mixing vessel is used to mix water and resin thoroughly. Periodically take samples for analysis. No water is added for MNRP.

NR's produced from primary or secondary recovery units, or whole oil, using WFE exhibit the same properties as those listed in Table 3, below.

Yields of NR60D-1H, using red maple as the lignocellulosic feedstock, ranges from about 16 to about 26% (w/w), and typically are about 23% (w/w). Yields of NR60D-2H range from about 12 to about 20% (w/w), and are typically about 17% (w/w). Yields of HR60D-WH range from 32 to about 48% (w/w) and are typically 40% (w/w).

Examples of the properties of several NR's prepared from the secondary recovery unit or whole-oil fraction are presented in Tables 3a and 3b. These parameters are typical for each defined sample, however, they are obtained from one sample and variations in these values are to be expected.

TABLE 3a

Properties of NR

| NR | Water content (wt %) | pH | Acid content (Dry wt %) | A.M.W.* Wet/Dry | NRP Index | Melting Point (° C.) | Viscosity @ 70° C. (cSt) |
|---|---|---|---|---|---|---|---|
| NR60D-WH | 16.5 | 2.6 | 2.4 | 306/363 | 60 | liquid | 110 |
| NR60D-2H | 16.5 | 2.6 | 2.4 | 287/340 | 60 | liquid | 70 |
| MNRP-1H(70) | 6 | 2.5 | 0.7 | n/d** | 90 | 70 | solid |
| MNRP-2H(70) | 6 | 2.5 | 0.7 | 388/412 | 90 | 70 | solid |

*Average Molecular Weight, Daltons
**not determined

TABLE 3b

Detailed properties of NR-60D-2H compared with Whole Oil

| Characteristic | Whole Oil | NR-60D-2H |
|---|---|---|
| pH | 2.26 | 2.36 |
| Water Content (wt %) | 23.4 | 17.4 |
| Acid Content (dry wt %) | 9.9 | 2.4 |
| Viscosity @ 70° C. (cSt) | 8 | 70 |
| NRP Index | 29 | 61 |
| Ash Content (wt %) | 0.08 | 0.03 |
| AMW (wet/dry) | 232/299 | 287/340 |
| Carbon | 44.90 | 51.22 |
| Hydrogen | 7.33 | 6.89 |
| Nitrogen | 0.21 | 0.29 |
| Sulfur | 0.05 | 0.05 |
| Oxygen | 24.03 | 24.12 |

A comparison of the phenolics, as determined by GC(TOF) MS within of whole-oil and NR60D-2H is provided in Table 3c. The data in this Table are an extract of the analysis, highlighting most of the phenolics in these samples, and indicate that the total phenolic content (determined from the complete analysis) of whole-oil is about 33.9 wt %, and for NR60D-2H, the total phenolic content is about 42.5 wt %.

Table 3c

Comparison of phenolic content between whole-oil and NR60D-2H derived from GC(TOF)MS analysis (* R.T. Retention Time in secs. These are approx. times using whole oil analysis for the reference R.T. Variations in time exist between analysis. Where times differ between whole oil and NR60D-2H. the R.T. is left blank).

|  |  | Whole Oil | | NR60-2H | |
| --- | --- | --- | --- | --- | --- |
| R.T.* | Name | Area % | Peak # | Area % | Peak # |
| 241.61 | Phenol | 6.5061 | 41 | 4.3904 | 40 |
| 364.11 | Phenol, 2-methyl | 1.7123 | 66 | 1.5168 | 69 |
| 412.11 | Phenol, 2-methoxy | 2.0703 | 74 | 2.2143 | 79 |
| 452.61 | Phenol, 2,3-dimethyl | 0.32788 | 82 | 0.30263 | 89 |
| 543.11 | Phenol, 2-ethyl | 0.40623 | 93 | .084498 | 108 |
| 558.12 | Ethanone, 1-(2-hydroxyphenol) |  |  | 0.024522 | 111 |
| 560.61 | Phenol, 2,4-dimethyl | 0.25740 | 95 | .64672 | 112 |
| 564.11 | Phenol, 2-(2-propenyl)-(Tent) DB5-802 | 0.024792 | 96 |  |  |
| 567.61 | 2,5-Dihydroxybenzaldehyde | 0.074999 | 97 | .27138 | 114 |
| 608.11 | Phenol, 4-ethyl | 0.042256 | 101 |  |  |
| 614.11 | Phenol, 2-ethyl | 0.033676 | 104 |  |  |
| 627.61 | Phenol, 3-4-dimethyl | 0.17496 | 105 |  |  |
| 644.61 | Phenol, 2-methoxy-4-methyl | 1.2882 | 108 | .36706 | 119 |
|  | Phenol, 3-ethyl |  |  | 0.037461 | 120 |
| 665.61 | Phenol, 3,4-dimethyl | 0.13768 | 112 | .15799 | 121 |
|  | Phenol, 2-methoxy-4-methyl |  |  | 1.4152 | 123 |
| 666.12 | Phenol, 3,4-dimethyl |  |  | 0.15818 | 128 |
| 672.11 | Phenol, 2,4,6-trimethyl | 0.21058 | 113 | .15089 | 129 |
| 700.61 | 1,2-Benzenediol | 0.74677 | 117 | .017686 | 134 |
| 748.12 | Resorcinol Monoacetate |  |  | 0.26544 | 138 |
| 752.61 | Phenol, 3-(1-methylethyl)- | 0.19326 | 120 | .16743 | 139 |
| 773.61 | Phenol, 3-(1-methylethyl) | 0.64036 | 122 | 0.64365 | 141 |
| 785.11 | Phenol, 3-(1-methylethyl) | 0.078711 | 126 |  |  |
| 806.11 | 1,2-Benzenediol.3-methoxy | 0.092985 | 127 | 1.3222 | 144 |
| 809.11 | Phenol, 4-ethyl-2-methoxy- | 0.050523 | 128 | 0.58397 | 146 |
| 819.11 | Phenol, 2-(2-propenyl), (Tent) DB5-802 | 0.021504 | 129 |  |  |
| 836.62 | Phenyl, 3,4,5-trimethyl |  |  | 0.052516 | 149 |
| 836.61 | 1,2-Benzenediol, 4-methyl | 0.0044058 | 134 | 0.93860 | 150 |
| 853.11 | Phenol, 4-ethyl-2-methoxy | 0.10123 | 138 | .11244 | 152 |
| 889.12 | Thymol |  |  | 0.18315 | 157 |
| 889.11 | Phenol, p-tert-butyl | 0.15713 | 142 |  |  |
| 914.61 | 1,2-Benzenediol,4-methyl | 0.063533 | 146 |  |  |
| 923.11 | Benzene, (3-methyl-2-butenyl)- | 0.034630 | 147 |  |  |
| 935.11 | 4-Hydroxy-3-methylacetophenone | 0.24843 | 148 |  |  |
| 949.11 | Phenol,2-(1,1-dimethylethyl)-5-methyl- | 0.0091629 | 151 |  |  |
| 956.61 | Benzaldehyde,4-hydroxy | 0.085893 | 152 |  |  |
| 1033.1 | 2-Methoxy-5-methylphenol | 0.27300 | 158 |  |  |
| 917.62 | 1,2-Benzenediol, 4-methyl |  |  | 1.5103 | 160 |
| 960.12 | Benzaldehyde, 4-hydroxy |  |  | 0.37630 | 165 |
| 1034.1 | Phenol, 2-methoxy-4-methyl |  |  | 0.31506 | 173 |
| 1034.6 | Phenol, 2,6-dimethoxy | 1.3823 | 159 | 1.9856 | 174 |
| 1045.1 | Phenol, 2-methoxy-5-(1-propenyl)-,(E)- | 0.20728 | 162 | .28363 | 175 |
| 1057.6 | 1,4-Benzenediol,2-methyl | 0.068245 | 164 | .032946 | 178 |
| 1060.1 | Phenol, 2-methoxy-4-propyl |  |  | 0.25673 | 179 |
| 1092.6 | Benzaldehyde, 4-hydroxy | 0.075885 | 167 |  |  |
| 1133.6 | Vanillin | 0.68202 | 173 | .055973 | 182 |
| 1138.1 | 1,3-Benzenediol, 4-ethyl | 0.25115 | 174 |  |  |
| 1140.1 | 1,3-Benzenediol, 4-ethyl |  |  | 0.35844 | 183 |
| 1163.1 | Phenol, 2-methoxy-4-(1-propenyl)- | 0.14949 | 177 | 0.19770 | 186 |
| 1169.1 | Ethanone, 1-(2-hydroxyphenyl)- |  |  | 0.10464 | 187 |
| 1228.6 | 1,3-Benzenediol, 4-ethyl | 0.071847 | 190 | .037727 | 194 |
| 1245.6 | 4-Nonylphenol | 0.018417 | 194 |  |  |
| 1254.1 | Benzoic acid, 4-hydroxy-3-methoxy | 0.27811 | 196 |  |  |
| 1229.6 | Benzeneacetic acid, α,4-dihydroxy |  |  | 0.087292 | 197 |
| 1255.1 | Ethanone, 1-(2,3,4-trihydroxyphenyl) |  |  | 0.21500 | 199 |
| 1257.1 | Phenol, 2-methoxy-5-(1-propenyl)-,(E)- | 0.29094 | 197 | .37792 | 200 |
| 1272.6 | Phenol, 4-ethyl-2-methoxy | 0.046344 | 200 | .062325 | 202 |
| 1277.6 | Ethanone, 1-(2-hydroxyphenyl) |  |  | 0.12035 | 203 |
| 1281.6 | Benzaldehyde, 2-hydroxy-, oxime |  |  | 0.042618 | 204 |
| 1317.1 | Benzeneacetaldehyde, α-phenyl |  |  | 0.012898 | 209 |
| 1333.1 | 3-tert-Butyl-4-hydroxyanisole |  |  | 1.1684 | 210 |
| 1280.1 | Benzoic acid, 4-methyl-,2-methylpropyl ester | 0.035040 | 201 |  |  |

-continued

| | | Whole Oil | | NR60-2H | |
|---|---|---|---|---|---|
| R.T.* | Name | Area % | Peak # | Area % | Peak # |
| 1282.6 | Phenol, 2-methoxy-4-propyl | 0.12796 | 202 | | |
| 1344.6 | Eugenol | 0.019586 | 210 | | |
| 1351.1 | Levodopa | 0.034104 | 211 | 0.49220 | 212 |
| 1386.1 | Phenol, 4-ethyl-2-methoxy | | | 0.040772 | 215 |
| 1397.1 | 1-Naphthalenol | 0.063726 | 216 | | |
| 1403.6 | Phenol, 2,4-bis(1,1-dimethylethyl)- | 0.054585 | 217 | | |
| 1424.6 | Butylated Hydroxytoluene | 12.087 | 218 | 10.861 | 219 |
| 1426.6 | Phenol, 4-(2-aminopropyl)-,(n) | | | 0.070690 | 220 |
| 1434.6 | Phenol, 4-[2-(methylamino)ethyl] | 0.042206 | 219 | .047516 | 221 |
| 1472.6 | Phenol, 2-methoxy-5-(1-propenyl),-(E) | | | 0.10844 | 224 |
| 1519.6 | 3-tert-Butyl-4-hydroxyanisole | 0.031443 | 225 | 0.031278 | 227 |
| 1520.1 | 3-tert-Butyl-4-hydroxyanisole | | | 0.031278 | 227 |
| 1536.1 | Phenol, 2,6-bis(1,1-dimethylethyl)-4-ethyl- | 0.044237 | 229 | | |
| 1538.1 | Phenol, 4-ethyl-2-methoxy | 0.049476 | 230 | | |
| 1553.6 | 3-tert-Butyl-4-hydroxyanisole | | | 0.10967 | 234 |
| 1566.1 | Ethanone, 1-(2,3,4-trihydroxyphenyl) | | | 0.070903 | 238 |
| 1570.6 | Ethanone, 1-4-hydroxy-3-methoxyphenyl)- | 0.055395 | 237 | .092669 | 240 |
| 1577.6 | Benzaldehyde, 2,4-dihydroxy-3,6-dimethyl | 0.027003 | 238 | .0083349 | 241 |
| 1617.1 | Phenol, 2,6-dimethoxy-4-(2-propenyl)- | 0.19601 | 244 | .30014 | 246 |
| 1647.6 | Benzeneacetic acid, 3,4-dihydroxy- | 0.14553 | 249 | | |
| | Benzeneacetic acid, 4-hydroxy-3-methoxy | | | 0.18419 | 250 |
| | Phenol, 2,6-dimethoxy-4-(2-propenyl) | | | .19360 | 251 |
| 1686.1 | Phenol, 4-methyl-2-nitro | 0.13512 | 252 | | |
| 1706.1 | Benzeneacetic acid, 4-hydroxy-3-methoxy- | 0.10507 | 254 | | |
| 1718.1 | Phenol, 2,6-dimethoxy-4-(2-propenyl) | 0.14338 | 255 | | |
| 1732.6 | Benzaldehyde, 4-hydroxy-3,5-dimethoxy | 1.2295 | 256 | 2.3095 | 252 |
| 1774.6 | Benzoic acid, 2,4-dihydroxy-3,6-dimethyl-, methyl ester | | | 0.027131 | 256 |
| 1820.6 | Phenol, 2,6-dimethoxy-4-(2-propenyl)- | 0.39642 | 262 | .32717 | 260 |
| 1862.1 | Benzeneacetic acid, 4-hydroxy-3-methoxy-, methyl ester | | | 0.084137 | 263 |
| 1872.1 | Phenol, 2,4,6-tris(1,1-dimethylethyl) | 0.056578 | 270 | | |
| 1931.1 | 3,5-di-tert-Butyl-4-hydroxybenzaldehyde | 0.14329 | 277 | .15838 | 269 |
| 1944.1 | Benzaldehyde, 3-hydroxy-4-methoxy | | | 0.020640 | 270 |
| 2006.1 | Benzeneacetic acid, 3,4-dihydroxy | 0.035096 | 281 | | |
| 2058.1 | Phenol, 2,6-dimethoxy-4-(2-propenyl) | 0.010906 | 286 | | |
| 2069.1 | Benzaldehyde, 4-hydroxy-3,5-dimethoxy | | | 0.060959 | 289 |
| 2152.1 | Phenol, 2,6-bis(1,1-dimethylethyl)-4-ethyl | 0.029731 | 291 | | |
| 2211.6 | Phenol, 2,6-bis(1,1-dimethylethyl)-4-ethyl | 0.029997 | 295 | | |
| 2172.1 | 3,5-di-tert-Butyl-4-hydroxybenzaldehyde | | | 0.059165 | 296 |
| 2301.1 | Phenol, 2,6-bis(1,1-dimethylethyl)-4-ethyl | 0.042017 | 298 | .051196 | 299 |
| 2377.6 | Phenol, 2-methyl-4-(1,1,3,3-tetramethylbutyl) | | | 0.045775 | 302 |
| 2463.6 | Benzaldehyde, 4-hydroxy-3,5-dimethoxy | | | 0.027143 | 305 |
| 2473.1 | Phenol, 2,6-bis(1,1-dimethylethyl)-4-ethyl | 0.051792 | 305 | | |
| 3755.1 | Benzaldehyde, 4-hydroxy-,(2,4-dinitrophenyl)hydrazone | 0.018597 | 313 | | |

V-Additive Lignin

A NR with a high melting point, greater than about 110° C. is called V-additive lignin, and may be made using any of the processes described above however, the time during distillation/evaporation process is increased, and the temperature during distillation/evaporation is also increased. Characteristics of V-additive lignin are presented in Table 3d. V-additive lignin is a highly polymerized MNRP, it is commuted to a powder or produced in a flake-like form prior to use. V-additive lignin is a thermoplastic product and is suitable for use within industrial applications, for example as a plasticizer that can be used within foundry resin formulations and admixed with sand, as an asphalt emulsifier, or as a concrete additive to increase the aeration quality of concrete. V-additive lignin may also be used within the automotive industry.

TABLE 3d

Anlaysis of V-Additive Lignin

| Properties | V-Additive Lignin |
| --- | --- |
| Melting Point ° C. | 110–150 |
| Gasoline Soluble % | 1 |
| Ash % | 0.01 |
| Flash Point | >280 |
| Density 25 C g/cm3 | 1.19 |
| Hydroxyl % | 1.4 |
| Methoxyl Content % | 5.3 |
| Colour | Dark Brown |
| Chemical Composition | |
| Phenolic Fraction | 95 |
| Hydrocarbon Fraction | 0.1 |
| Rosin-Derived Fraction (acids) | 1 |
| Water | 3 |
| Ester, Aldehyde, Alcohol | 0.9 |

Example 3
Replacement of Phenol within NR-containing PF Resins and Their Use in OSB Manufacture The NR produced according to the method of Example 2 is formulated into a resin according to industry standards except that 40% of the phenol content is replaced by the NR. The adhesive resin comprised a formaldehyde:(phenol+NR) ratio of 1.6:1. An adhesive prepared from a Bio-oil-WH (i.e. the whole-oil feedstock), that had not been processed by distillation/evaporation is included for comparison.

Typical NR resin formulations involved loading phenol, water and paraformaldehyde into a kettle and heating to 95° C. to dissolve the paraformaldehyde. The mixture is cooled to 45° C. and the NR added. Caustic (NaOH) is then added to the desired pH thereby solubilizing the NR and initiating the reaction. During the addition of caustic, the mixture is maintained at 45° C. for the first caustic addition (approximately ⅔ of the amount required). The mixture is then slowly heated to 90° C. over a 30 min period over which time the resin is monitored for viscosity and subsequently cooled prior during which the remaining caustic is added. The resin is maintained at 10° C. until use. The resultant formulations are characterized in Table 4.

TABLE 4

Adhesive Characterization for OSB

| NR portion of resin | Viscosity (cps) | Solids content (%)* | Free CHOH (%) | Gel Time (sec) | pH | Amount of Caustic (wt %) |
| --- | --- | --- | --- | --- | --- | --- |
| NR60D-WH | 78 | 41.7 | 1.21 | <600 | 10.44 | 7.97 |
| NR60D-2H | 81 | 41.88 | 1.36 | 684 | 10.45 | 8.6 |
| MNRP-1H(70) | 120 | 44.06 | 1.56 | 521 | 10.67 | 9.57 |
| MNRP-2H(70) | 101 | 43.78 | 2.11 | 672 | 10.46 | 8.09 |
| Biooil-WH | 70 | 40.37 | 0.8 | 733 | 10.53 | 7.97 |

*determined by heating resin sample at 105° C. for 16 hours

The OSB's are prepared following standard industrial procedures using one of the adhesive resins listed in Table 4 as well as a control (commercial) resin. The parameters for OSB production are as follows:

| | |
| --- | --- |
| Strands: | 3 inch poplar from an OSB mill |
| Panel type: | homogenous |
| Panel thickness: | 7/16" |
| Panel size: | 18" × 18" |
| Resin content: | 2.0% (solids basis) |
| Wax content: | 1.5% |
| Mat moisture: | 5.5% |
| Total Press time: | 180 sec |
| Press temperature: | 215° C. |
| Press pressure: | 1350 psi |
| Replication: | 4 |

The prepared OSB are tested for the following properties: density, IB (internal bond), MOR (modulus of rupture), and MOE (modulus of elasticity), according to the Canadian product standard for OSB (CSA 0437.1-93, April 1993). Twenty OSB panels are manufactured using the five resins (4 NR-based resins and one control). The panels are tested right after pressing, without conditioning. The test results are presented in Table 5

TABLE 5

Summary of OSB Panel Test Results

| NR-based resin | Density of IB sample | IB (MPa) | MOR (MPa) Dry | MOR (MPa) Wet | MOE (MPa) | Torsion Shear Wet (in.lb) | Thickness Swelling (%) | Water Absorption (%) |
| --- | --- | --- | --- | --- | --- | --- | --- | --- |
| Control | 670 | 0.586 | 34 | 15.7 | 4300 | 40.9 | 15.4 | 30 |
| NR60D-WH | 670 | 0.46 | 37.2 | 17.6 | 4600 | 26.1 | 18.7 | 33.6 |
| NR60D-2H | 669 | 0.553 | 36.3 | 15.7 | 4700 | 36.6 | 17.7 | 32.1 |
| MNRP-1H70 | 671 | 0.593 | 35 | 17.3 | 4700 | 34.1 | 17.9 | 33.2 |
| MNRP-2H70 | 670 | 0.558 | 29.8 | 18.1 | 4000 | 40 | 16.3 | 32.6 |
| Biooil-WH | 652 | 0.419 | 26 | 14.9 | 4100 | 20.5 | 18.9 | 40.1 |

Panels produced using a resin composition comprising NR, substituted for 40% of phenol, exhibit properties equivalent to that of the commercial PF resin composition. The OSB prepared using NR based resins does not exhibit any difference in appearance compared with OSB's prepared using PF resins. The NR-based resins exhibit better properties than the Biooil-WH (light pitch) based resin that had not been processed using distillation/evaporation. The Biooil-WH bonded panels did not meet OSB and wafer board specifications as set out in CSA Standard 0437.093.

The panels produced using NR-based resins exceeded the CSA Standard (0437.0-93) for all parameters, except for thickness swelling. As the panels are tested right after pressing without conditioning, it is expected that thickness swelling and water absorption could be lowered by conditioning the panels to a constant mass and moisture content prior to the test. Furthermore, as the NR-based resins have a lower viscosity and alkalinity, the adhesive easily penetrates into the veneer and may starve the glue joint. Optimization of the penetrating property of these resins will increase bonding strength and associated properties.

These results indicate that a substantial proportion of phenol within PF resin formulations may be replaced with NR and the resultant adhesive performs as well, or exceeds the performance of commercially available resins. Furthermore, these results indicate that the processing of whole-oil (light pitch) as described herein produces an NR suitable for PF resin use.

Example 4

Replacement of Phenol within NR-containing PF Resins and Their Use in Plywood Manufacture The NR produced according to the method of Example 2 is formulated into a resin according to industry standards except that 40% of the phenol content is replaced by the NR. The adhesive resin comprised a formaldehyde:(phenol+NR) ratio of 1.6:1. NR-based resin formulations were prepared as follows: water (125.4 g; 13.2 wt %) is mixed with soda ash (4.75 g; 0.5 wt %) for 5 min. To this wheat flour (63.7 g; 6.7 wt %) is added and mixed for 10 min. NR (337 g; 35.5 wt %), NaOH (50% solution, 26.6 g; 2.8 wt %) and Cocob (55.1 g; 5.8 wt %) are added and mixed for 15 min. A further amount of NR (337.5 g; 35.5 wt %) is added and mixed for 15 min. Commercial plywood resin is also prepared according to industry standards. The resultant formulations are characterized in Table 6.

TABLE 6

Adhesive Characterization for Plywood

| NR portion of resin | Viscosity (cps) | Solids content (%)* | Free CHOH (%) | Gel Time (sec) | pH | Amount of Caustic (wt %) |
|---|---|---|---|---|---|---|
| NR60D-WH | 1385 | 42.98 | 0.5 | <500 | 10.44 | 7.97 |
| NR60D-2H | 1120 | 42.02 | 0.6 | 476 | 10.45 | 8.6 |
| MNRP-1H(70) | 1070 | 44.35 | 0.91 | 446 | 10.67 | 9.57 |
| MNRP-2H(70) | 1125 | 44.28 | 1.48 | 558 | 10.46 | 8.09 |

*determined by heating resin sample at 105° C. for 16 hours

Plywood panels are prepared following standard industrial procedures using one of the adhesive resins listed in Table 5 as well as a control (commercial) resin. The parameters for plywood panel production were as follows:

| | |
|---|---|
| Panel construction: | 3 ply, 305 × 305 mm (12" × 12"), yellow birch |
| Veneer thickness: | 1.5 mm |
| Veneer moisture: | 8.6% |
| Glue spread: | 20 g/ft$^2$ (215 g/m$^2$, or 44 lb/1000 ft$^2$) |
| Open assembly time: | 5 min* |
| Press time: | 3,4,5,7 min. |
| Press temperature: | 160° C. |
| Replication: | 4 per glue |

*20 min for NR60D-WH

The prepared plywood panels are tested for shear strength under both dry and 48 hour soaked conditions. Twenty OSB panels were manufactured using the five resins (4 NR-based resins and one control). The panels were tested right after pressing, without conditioning. Specimens are tested to failure by tension in the dry condition (average 10 specimens). The test results are presented in Table 7

TABLE 7

Summary of Plywood Panel Test Results*

| Glue | Press Time (min) | Shear Strength (MPa) Dry Test |
|---|---|---|
| Commercial Plywood Adhesive | 3 | 3.831 (0.537) |
| | 4 | 4.030 (0.523) |
| | 5 | 2.732 (0.425) |
| | 7 | 3.692 (0.280) |
| | Avg. | 3.571 (0.576) |
| MNRP-1H70 | 3 | 3.415 (0.182) |
| | 4 | 3.586 (0.169) |
| | 5 | 3.782 (0.354) |
| | 7 | 3.736 (0.447) |
| | Avg. | 3.629 (0.166) |
| MNRP-2H70 | 3 | 3.503 (0.201) |
| | 4 | 3.932 (0.314) |
| | 5 | 3.129 (0.252) |
| | 7 | 2.970 (0.334) |
| | Avg. | 3.384 (0.429) |
| NR60D-2H | 3 | 2.697 (0.208) |
| | 4 | 2.799 (0.192) |
| | 5 | 3.254 (0.239) |
| | 7 | 2.624 (0.208) |
| | Avg. | 2.843 (0.283) |
| NR60D-WH | 3 | 3.111 (0.270) |
| | 4 | 3.041 (0.296) |
| | 5 | 3.347 (0.379) |
| | 7 | 3.515 (0.305) |
| | Avg. | 3.254 (0.218) |
| NR60D-WH** | 3 | 3.761 (0.490) |
| | 7 | 2.836 (0.193) |
| | Avg. | 3.298 (0.655) |

*Values in parentheses are standard deviations.
**Open assembly time was 20 min for the panels made with this glue, which was the time interval between applying adhesive on the veneers and closing them together before bonding.

The dry shear strength of the NR-based resins are comparable to the commercial adhesive bonded panel, and all panels meet the minimum shear strength of 2.5 MPa required under CSA standard 0112.6-M1977. The NR-based resins have a lower viscosity and alkalinity, and the adhesive may easily penetrate into the veneer and starve the glue joint. Optimization of the penetrating property of these resins will increase bonding strength and associated properties.

These results indicate that a substantial proportion of phenol within PF resin formulations may be replaced with an NR fraction obtained from bio-oil for the preparation of adhesives for use in plywood manufacture.

Example 5
Testing of NR60D-2H with PF Adhesives
A) NR60D-2H at 10 and 20%

Eleven 3'×3'×0.5" plywood panels are manufactured in order to evaluate the effects of varying concentrations NR60D-2H substitution for phenol in PF resin.

Plywood Panel Manufacture

Blending and Forming

Three different resin compositions are applied to pine veneers (Table 8). This resulted in three groups with a minimum of three panels per group. All applications are made at a 35 lb/1000 ft² loading rate. All resins are applied using a plywood glue spreader and applied on a single glue line.

Billet lay-up for each panel consists of four plies. The face plies are laid-up parallel to the machine direction and the core plies are laid-up perpendicular to machine direction. Three control panels, four PF/NR60D-2H, at 10% panels (Group NR60-10%), and four PF/NR60D-2H at 20% (Group NR60-20%) panels are manufactured in the trial.

TABLE 8

| Group ID | No of Panels | Resin Type | Resin Loading | Pressing Time (sec) |
|---|---|---|---|---|
| Control | 3 | GP PF Resin (Control) | 35 lbs/1000 ft² single glue line | 300 |
| NR60-10% | 4 | GP PF/NR 10 Resin | 35 lbs/1000 ft² single glue line | 300 |
| NR60-20% | 4 | GP PF/NR 20 Resin | 35 lbs/1000 ft² single glue line | 300 |

Pressing and Testing:

Before pressing, the billets are pre-pressed (cold) at 150 psi for four minutes in a 4'×8' press. The panels are then transferred for hot pressing to a 3'×3' press. The panels are pressed under constant pressure control for 300 seconds at 300° F. Pressing is monitored and controlled with a Press-MAN© Press Monitoring System. After pressing, the panels are trimmed to 28"×28" dimensions and hot stacked. Once cooled, the panels are evaluated. The panels are tested for plywood glue bond and flexural creep (CSA standard 0151-M1978).

No resin quality differences are noted visually during panel manufacture. The control and NR substituted resins behaved in the same manner with equal spreadability. The shear data indicates the NR substituted resin performed as well as the control (Table 9). The NR60D-2H (10%) and NR60D-2H (20%) resins both performed comparably to the control, under both test conditions with respect to shear strength. The resins showed exemplary strength characteristics with the ply only failing on the glue bond a maximum of 12% (PG2-88% average wood failure) under both test conditions. The strength of the NR-resin data is further supported by the fact not one sample demonstrated less than 60%, or less than 30%, wood failure under both test conditions.

TABLE 9

Test data summary using NR-based plywood shear tests with both NR60D-2H (105) and NR60D-2H (20%) (Average values for ten specimens per panel from 3 panels per group)

| Test Condition | Property | CSA 0151 Requirement | Units | Control | NR 60 10% | NR60 20% |
|---|---|---|---|---|---|---|
| Vacuum-Pressure Soak: | Shear Strength | No. Req. | psi | 89 | 102 | 88 |
| | Percent Wood Failure Average | 80 | % | 95 | 90 | 88 |
| | Percent Wood Failure ≧ 60 | 90 | % | 100 | 100 | 100 |
| | Percent Wood Failure ≧ 30 | 95 | % | 100 | 100 | 100 |
| Boil-Dry Boil: | Shear Strength | No. Req. | psi | 79 | 80 | 69 |
| | Percent Wood Failure - Average | 80 | % | 91 | 90 | 91 |
| | Percent Wood Failure ≧ 60 | 90 | % | 93 | 100 | 100 |
| | Percent Wood Failure ≧ 30 | 95 | % | 100 | 100 | 100 |

B) NR60D-2H used at 25% for the Preparation of Plywood and OSB Panels

A total of seventeen 3'×3'×0.50" OSB, and fifteen 3'×3'×0.50" plywood panels were manufactured to evaluate the effects of 25% substitution of NR60D-2H for phenol in PF resin, for both OSB and plywood.

OSB Panel Manufacture

Blending and Forming:

The resins are supplied by Neste in the following formats: Neste PF face control #1, Neste PF core control #2 and Neste PF/NR-60-25% (experimental). Three groups of panels are manufactured as indicated in Table 10. The control group (SNC) consists of the Neste face control #1 resin applied to the strands along with commercial E-wax; the strands are then formed into random homogenous mats. The first experimental group (SNE) consists of the substitution of the Neste PF/NR60-25% resin for the face control resin in the same manufacturing methodology. The final experimental OSB group (SN) utilizes Neste PF/NR 60-25% on the panel face strands and the Neste core control #2 on the panel core strands. The SN mats are of 50/50 face-core random construction.

TABLE 10

PF AND PF-NR60 RESIN OSB TESTS

PANEL SPECIFICATIONS

| Group ID | No. of Panels | Resin Content | Construction | Thickness (in.) | Density (lb/ft³) | Comments |
|---|---|---|---|---|---|---|
| SNC | 8 | Neste PF Face resin, 3.5% (Control #1) | Homogenous | 0.5 | 39 | OSB control |

TABLE 10-continued

PF AND PF-NR60 RESIN OSB TESTS

| | | | PANEL SPECIFICATIONS | | | |
|---|---|---|---|---|---|---|
| Group ID | No. of Panels | Resin Content | Construction | Thickness (in.) | Density (lb/ft$^3$) | Comments |
| SNE* | 6 | Neste PF/NR 25, 3.5% | Homogenous | 0.5 | 39 | OSB Trial |
| SN** | 3 | Face: Neste PF/NR 25, 3.5% Core: Neste PF core resin, 3.5% (Control #2) | 50/50 face-core | 0.5 | 39 | Face NR Substitute Core Control on OSB |

*NR/RF resin used on the surface and core of the OSB
**NR/PF resin used on surface only All resins are applied at a 3.5% solids basis. The commercial e-wax is applied at a 1.0% solids basis. All billets are hand formed to yield a density of 39 lb/ft$^3$ when pressed to a thickness of 0.5".

After formation, the mats are then pressed utilizing a standard OSB pressing cycle. The total pressing time is set to a conservative 400-second cycle to ensure complete cure of the applied resin. Pressing is monitored and controlled with a PressMAN© Press Monitoring System.

After pressing, the panels arere removed, trimmed to 28"×28" dimensions, and measured for out-of-press thickness and density and the panels are hot-stacked. Upon cooling, the panels are tested (CSA Standard 0437.2-93) for: MOR/MOE, IB, bond durability (2 hr and 6 hr cycles), thickness swell (24 hr soak), and linear expansion (ODVPS) as well as flexural creep.

Plywood Panel Manufacture

Glue Spreading and Veneer Lay Up

Two plywood resins are used for the study. The first resin is Neste PF (plywood control) while the second is Neste PF/NR 25 (plywood experimental). The veneer used for plywood manufacture is pine.

The resins are applied to the veneers using a glue spreader. A rate of 35 lbs.per 100 ft$^2$, applied on a single glue line is utilized. The lay up consisted of two face veneers, parallel to machine direction, and two core veneers, perpendicular to machine direction, for each panel. Eleven control (Group PNC) and four experimental (Group PNE) panels, are manufactured (Table 11).

During lay up, gluing time, open assembly time, prepressing time and closed assembly time were measured for each panel.

Pressing and Testing

After pre-pressing at four minutes and 150 psi, the billets are placed in a press for final cure and pressing. The first seven control panels (PNC 1-7) are used to establish the pressing time. This resulted in the establishment of 300 seconds as the required pressing time. Pressing is monitored and controlled via a PressMAN© Press Monitoring System.

After pressing, the panels are then trimmed to 28"×28" dimensions and hot stacked. Upon cooling, the panels are evaluated. Testing consisted of glue-bond shear and flexural creep evaluation.

Virtually no difference is observed between the control and NR substitution resins. Color, viscosity and spreadability for all resins is equal, and all resins behave equally in a manufacturing situation.

A comparison of the NR substituted resins versus the control (SN, SNE, vs. SNC) shows bending and bond properties to be equal between the three groups (Table 12). The results indicate, especially with group SN, a drop in bond durability and linear expansion versus the control. Group SN showed a value of water swell well within the maximum requirement (data not included)

TABLE 11

PF AND NR60D-2H at 20% RESIN PLYWOOD SHEAR TESTS

| | No. of | | PANEL SPECIFICATIONS | | |
|---|---|---|---|---|---|
| Group ID | Panels | Resin Content | Construction | Thickness (in.) | Comments |
| PNC Control | 11 | 35 lb/m SGL Neste PF (plywood) | Four ply pine Veneers | 0.5 | Plywood control |
| PNE (NR-25%) | 4 | 35 lb/m SGL Neste PF/NR (plywood) | Four ply pine Veneers | 0.5 | Plywood test resin |

TABLE 12

SUMMARY OF PF AND PF/NR60 at 25% OSB TESTS

| Property | Req | Units | Control Group (SNC) | NR Surface/ Neste Core (SN)* | NR Surface/NR Core (SNE**) |
|---|---|---|---|---|---|
| Modulus of Rupture (after pre-conditioning) | Min. 2500 | psi | 3210 | 3190 | 3190 |
| Modulus of Elasticity (after pre-conditioning) | Min. 450 | psi × 1000 | 479 | 493 | 469 |
| Internal Bond (after pre-conditioning) | Min. 50.0 | psi | 56.3 | 49.7 | 54.6 |
| Bond Durability: | | | | | |
| MOR after 2 HR. BOIL (tested when wet) | Min. 1250 | psi | 1.8e+07 | 13101550 | 14201870 |
| MOR after 6 cycle | Min. 1250 | psi | | | |

*NR/PF resin used on surface only
**NR/RF resin used on the surface and core of the OSB With respect to the plywood shear testing the results are favourable both against the standard and the control Group (Table 13). A strong bond is indicated by the shear strength performance under both test conditions. Under both conditions 11% or less failure could be attributed to the glue while the maximum allowable is 20% (89% wood failure for Group PNE under boil-dry-boil). A further indicator in the strength of the data is that not one PNE sample showed wood failure values of less than 60% or 30% under both test conditions (100% pass for both requirements on both test regimens).

TABLE 13

SUMMARY OF PF AND PF/NR60 at 25% RESIN PLYWOOD SHEAR TESTS

| Test Condition | Property | CSA 0151 Requirement | Units | Control Group (PNC) | Neste NR/PF (PNE) |
|---|---|---|---|---|---|
| Vacuum-Pressure Soak: | Shear Strength | No. Req. | psi | 82 | 110 |
| | Percent Wood Failure Average | 80 | % | 87 | 93 |
| | Percent Wood Failure ≥ 60 | 90 | % | 93 | 100 |
| | Percent Wood Failure ≥ 30 | 95 | % | 100 | 100 |
| Boil-Dry Boil: | Shear Strength | No. Req. | psi | 74 | 83 |
| | Percent Wood Failure Average | 80 | % | 89 | 89 |
| | Percent Wood Failure ≥ 60 | 90 | % | 100 | 100 |
| | Percent Wood Failure ≥ 30 | 95 | % | 100 | 100 |

Example 6
OSB Testing of NR-60 and MNRP

Further tests were carried out at W.K.I. in Germany to assess the industrial performance of NR-containing resins against a commercial PF OSB resin. Control resins, and resins having from 20% to 50% phenol substitution of either NR-60 or MNRP were manufactured and used for testing. Testing of the OSB boards were compared against European Standards for test protocols including V100, EN 300/1997, typically at three press cycles in the range of 12–16 s/mm.

Boards were tested according to EN 300/1997 and particularly for Type 4 OSB, for heavy duty load-bearing. Further to the V100 value, the option 2 V100 test (conducted after the boiled samples were dried) was also carried out. NR-60

The properties of the NR-60 at 30%, and control resins, and the results of the W.K.I. board tests are given in Table 14.

TABLE 14

Resin specifications, and Properties of the OSB samples using NR-60 at 30% substitution

| | Control | NR-60 |
|---|---|---|
| Resin # | | |
| % substitution | — | 30% |
| Molar ratio | 2.10 | 1.87 |
| NaOH, % | 6.0 | 7.4 |
| Solids 2 h @ 120° C. | 42.1 | 53.5 |
| Viscosity, cp | 370 | 350 |
| Alkalinity test, % | 5.92 | 6.31 |
| Properties of OSB | | |
| Density, kg/m | 661 | 681 |
| IB, N/mm$^2$ | 0.55 | 0.55 |
| V100, N/mm$^2$ | 0.24 | 0.24 |
| V100 option 2, N/mm$^2$ | 0.44 | 0.52 |
| MOR, N/mm$^2$ | 23.7 | 23.9 |
| MOR after boiling | 10.8 | 10.5 |
| 24 h swells, % | 19.4 | 18.0 |
| HCHO, mg | 1.19 | 1.11 |
| Moisture, % | 4.27 | 5.29 |

These results indicate that the NR-60 performed at least as well as the control, while the V100 Option 2 values and swells were improved when compared to the control. The results from the OSB trial were successful and they confirmed results obtained in the lab.

Repeated trials using NR-60 based resins at 30% substitution, and OSB made using this resin are present in Table 15.

TABLE 15

Resin specifications, and Properties of the OSB samples using NR-60 at 30% substitution

| | Control | NR-60 |
|---|---|---|
| Resin # | | |
| % substitution | — | 30% |
| Molar ratio | 2.10 | 1.84 |
| NaOH, % | 6.0 | 7.4 |
| Solids 2 h @ 120° C. | 42.1 | 43.2 |
| Viscosity, cp | 370 | 340 |
| Alkalinity test, % | 5.92 | 6.36 |
| Properties of OSB: 12 s/mm press cycle | | |
| Density, kg/m | 722 | 726 |
| IB, N/mm$^2$ | 0.61 | 0.81 |
| V100, N/mm$^2$ | 0.19 | 0.27 |
| 24 h swells, % | 16.5 | 13.7 |
| Properties of OSB: 14 s/mm press cycle | | |
| Density, kg/m | 728 | 722 |
| IB, N/mm$^2$ | 0.82 | 0.92 |
| V100 | 0.29 | 0.33 |
| 24 h swells, % | 14.1 | 16.1 |
| HCHO, mg | 2.8 | 1.7 |
| Moisture, % | 8.1 | 7.9 |

TABLE 15-continued

Resin specifications, and Properties of the OSB samples using NR-60 at 30% substitution

|  | Control | NR-60 |
|---|---|---|
| Properties of OSB: 16 s/mm press cycle | | |
| Density, kg/m | 734 | 724 |
| IB, N/mm$^2$ | 0.93 | 0.94 |
| V100 | 0.34 | 0.37 |
| 24 h swells, % | 14.5 | 14.4 |

These results demonstrate that the properties of the OSB made using NR-60 resins exceeded those of the control resin. The use of NR-60 at 30% of phenol indicates that the effectiveness of the phenolic resin was equal or even better than the respective ones of the control; all wet properties seemed unchanged, while the (free) formaldehyde release was substantially reduced. Furthermore, these results demonstrate that the NR-60 product is consistent when produced at different times, from different NR60-D batches, and used in independent trials.

A second series of NR resins were prepared using standard NR-60 products to substitute up to 40% of the phenol. These NR-60 substituted resins and the OSB made using these resins are compared to a control resin in Table 16.

TABLE 16

Resin specifications, and Properties of the OSB samples using NR-60 at 40% substitution

|  | Control | NR-60 | Control* | NR-60* |
|---|---|---|---|---|
| Resin # | | | | |
| % substitution | — | 40% | — | 40 |
| Molar ratio | 2.10 | 2.04 | 2.10 | 1.50 |
| NaOH, % | 6.10 | 7.40 | 6.1 | 7.4 |
| Solids 2 h @ 120° C. | 42.2 | 44.0 | 42.0 | 43.3 |
| Viscosity, cp | 380 | 340 | 320 | 330 |
| Alkalinity test, % | 6.18 | 6.54 | 5.50 | 5.95 |
| Properties of OSB: 12 s/mm press cycle | | | | |
| Density, kg/m | 719 | 716 | 714 | 722 |
| IB, N/mm$^2$ | 0.58 | 0.50 | 0.83 | 0.66 |
| V100, N/mm$^2$ | 0.20 | 0.12 | 0.36 | 0.35 |
| 24 h swells, % | 17.6 | 19.0 | 14.7 | 15.5 |
| Properties of OSB: 14 s/mm press cycle | | | | |
| Density, kg/m | 736 | 726 | 725 | 730 |
| IB, N/mm$^2$ | 0.71 | 0.73 | 0.92 | 0.93 |
| V100, N/mm$^2$ | 0.30 | 0.24 | 0.39 | 0.35 |
| 24 h swells, % | 17.4 | 17.6 | 14.7 | 14.2 |
| MOR before | 25.2 | 23.5 | 24.6 | 21.2 |
| after boiling | 7.4 | 5.9 | 6.7 | 5.6 |
| HCHO, mg | 2.4 | 1.3 | 3.2 | 0.8 |
| Moisture, % | 8.4 | 8.4 | 8.3 | 8.3 |
| Properties of OSB: 16 s/mm press cycle | | | | |
| Density, kg/m | 742 | 727 | 726 | 726 |
| IB, N/mm$^2$ | 0.65 | 0.65 | 1.01 | 0.94 |
| V100 | 0.34 | 0.20 | 0.43 | 0.32 |
| 24 h swells, % | 17.4 | 19.6 | 15.7 | 15.3 |

*separate trail using different NR-60

Collectively the results in Table 16 demonstrate that, both dry and wet, the properties of the NR-60 OSB at 40% phenol substitution exceeded those of the OSB boards produced with the commercial PF resin (control). The free formaldehyde of NR-60 boards was lower than that of the control. In general, the OSB board properties of the NR-60 based resin met or exceeded the control resin board properties, and the board properties of the NR-60 resin met or exceeded most of the control resin OSB board properties. Furthermore, batch-to-batch consistency of NR-60 is observed since both NR-60 based resins performed equally as well.

MNRP

Resins comprising 20, 40 and 50% MNRP substitution, in place of phenol were also evaluated, and the results are presented in Tables 17, 18 and 19, respectively.

TABLE 17

Resin specifications and Properties of the OSB samples using MNRP at 20% substitution

|  | Control | MNRP |
|---|---|---|
| Resin # | | |
| % substitution | — | 20% |
| Molar ratio | 2.10 | 2.14 |
| NaOH, % | 6.10 | 6.55 |
| Solids 2 h @ 120° C. | 42.1 | 41.5 |
| Viscosity, cp | 360 | 370 |
| Alkalinity test, % | 5.67 | 5.53 |
| Properties or OSB: 12 s/mm press cycle | | |
| Density, kg/m | 726 | 737 |
| IB, N/mm$^2$ | 0.68 | 1.03 |
| V100, N/mm$^2$ | 0.26 | 0.37 |
| 24 h swells, % | 14.9 | 13.3 |
| Properties of OSB: 14 s/mm press cycle | | |
| Density, kg/m | 726 | 733 |
| IB, N/mm$^2$ | 0.61 | 0.75 |
| V100, N/mm$^2$ | 0.25 | 0.27 |
| 24 h swells, % | 16.6 | 13.9 |
| MOR, N/mm$^2$ | 23.9 | 25.3 |
| MOR retention, % | 27.6 | 23.4 |
| HCHO, mg/100 gm | 2.5 | 1.4 |
| Moisture, % | 8.0 | 8.0 |
| Properties of OSB: 16 s/mm press cycle | | |
| Density, kg/m | 734 | 737 |
| IB, N/mm$^2$ | 0.95 | 0.79 |
| V100, N/mm$^2$ | 0.35 | 0.25 |
| 24 h swells, % | 15.5 | 14.4 |

TABLE 18

Resin specifications, and Properties of the OSB samples using MNRP at 40% substitution

|  | Control | MNRP | MNRP |
|---|---|---|---|
| Resin # | | | |
| % substitution | — | 40% | 40% |
| Molar ratio | 2.10 | 2.10 | 2.10 |
| NaOH, % | 6.10 | 7.65 | 7.6 |
| Solids 2 h @ 120° C. | 42.0 | 44.3 | 43.4 |
| Viscosity, cp | 320 | 340 | 320 |
| Alkalinity test, % | 5.50 | 6.44 | 6.28 |
| Properties of OSB: 12 s/mm press cycle | | | |
| Density, kg/m | 714 | 733 | 725 |
| IB, N/mm$^2$ | 0.83 | 0.78 | 0.77 |
| V100, N/mm$^2$ | 0.36 | 0.32 | 0.27 |
| 24 h swells, % | 14.7 | 16.8 | 17.4 |
| Properties of OSB: 14 s/mm press cycle | | | |
| Density, kg/m | 725 | 742 | 730 |
| IB, N/mm$^2$ | 0.92 | 1.01 | 0.91 |
| V100, N/mm$^2$ | 0.39 | 0.28 | 0.35 |
| 24 h swells, % | 14.7 | 16.5 | 14.4 |
| MOR, before | 24.6 | 23.7 | 24.0 |
| MOR, after boiling | 6.76 | 5.8 | 5.6 |
| HCHO, mg | 3.2 | 1.8 | 2.0 |
| Moisture, % | 8.3 | 8.1 | 7.8 |

TABLE 18-continued

Resin specifications, and Properties of the OSB samples using MNRP at 40% substitution

|  | Control | MNRP | MNRP |
|---|---|---|---|
| Properties of OSB: 16 s/mm press cycle |  |  |  |
| Density, kg/m | 726 | 728 | 730 |
| IB, N/mm² | 1.01 | 0.98 | 0.96 |
| V100, N/mm² | 0.43 | 0.34 | 0.37 |
| 24 h swells, % | 15.7 | 17.0 | 16.5 |

TABLE 19

Resin specifications, and Properties of the OSB samples using MNRP at 50% substitution

|  | Control | MNRP |
|---|---|---|
| Resin # |  |  |
| % substitution | — | 50% |
| Molar ratio | 2.10 | 2.10 |
| NaOH, % | 6.10 | 7.55 |
| Solids 2 h @ 120° C. | 42.0 | 43.5 |
| Viscosity, cp | 475 | 350 |
| Alkalinity test, % | 5.50 | 5.55 |
| Properties of OSB: 12 s/mm press cycle |  |  |
| Density, kg/m | 724 | 718 |
| IB, N/mm² | 0.99 | 0.61 |
| V100, N/mm² | 0.36 | 0.18 |
| 24 h swells, % | 14.8 | 17.6 |
| Properties of OSB: 14 s/mm press cycle |  |  |
| Density, kg/m | 729 | 726 |
| m, N/mm² | 0.98 | 0.76 |
| 24 h swells, % | 15.0 | 16.3 |
| MOR, before boiling | 22.8 | 24.2 |
| MOR, after boiling | 7.2 | 4.6 |
| HCHO, mg | 3.3 | 1.6 |
| Moisture, % | 8.1 | 8.6 |
| Properties of OSB: 16 s/mm press cycle |  |  |
| Density, kg/m | 747 | 728 |
| IB, N/mm² | 1.03 | 0.84 |
| V100, N/mm² | 0.43 | 0.28 |
| 24 h swells, % | 16.3 | 16.5 |

These results indicate that the MNRP-based resin is as or more reactive than the control resin, since the best results were obtained at shortest press cycle. It is also notable that the swelling values are low. At 40% substitution MNRP produced OSB boards that were comparable to control OSB boards even at short press cycles. At 50% substitution with MNRP, the board properties were reduced as compared to the control's, and longer press cycles were required to achieve satisfactory results.

Example 7

Analysis of MNRP Based Resin

A set of panels 28"×28" were prepared using strands from Ainsworth or Draytion Valley AB. A core and surface resin were used for the preparation of the pannels. The core resin was MDI (Rubinate 1840), and the surface resin was either a control (commercial) or MNRP resin at the concentrations listied in Table 20.

TABLE 20

Resins used for panel preparation.

|  |  | PF Resin | | | |
|---|---|---|---|---|---|
|  | Panel Set | Urea % | Solids % | Viscosity cp @ 25° C. | Alkalinity % |
| 2 | ACM control | 7.0 | 49.9 | 160 | 3.18 |
| 3 | MNRP 30% | 4.8 | 45.0 | 250 | 6.50 |
| 4 | MNRP 30% | 6.8 | 52.5 | 160 | 3.50 |
| 5 | Ainsworth control | — | — | — | — |
| 7 | MNRP 50% | 7.0 | 53.2 | 150 | 3.63 |
| 8 | MNRP 30% | 12.0 | 51.4 | 175 | 3.46 |

The panels were prepared having a wax content of 1.0%, using random orientation of strands (face/core 55/45), with a target thickness of 7/16", press temperature of 400° F., and press closing 30 sec. Panels were tested for Modulus of Rupture, Modulus of elasticity, Internal Bond (all CSA 0437), Thickness swell, Water Absorption and Edge Swell. The results are presented in Table 21.

TABLE 21

Analysis of OSB prepared using resins and panel sets defined in Table 20

|  | Panel Set | | | | | | |
|---|---|---|---|---|---|---|---|
|  | 2 | 3-1* | 3-2* | 4* | 5 | 7* | 8* |
| Density, kg/m³ | 609 | 622 | 618 | 634 | 615 | 640 | 603 |
| Hot IB, N/mm² | 0.352 | 0.407 | 0.388 | 0.381 | 0.392 | 0.272 | 0.359 |
| IB dry, N/mm² | 0.267 | 0.300 | 0.329 | 0.386 | 0.268 | 0.341 | 0.207 |
| IB wet, N/mm² | 0.022 | 0.042 | 0.024 | 0.033 | 0.024 | 0.015 | 0.028 |
| MOR dry, N/mm² | 16.94 | 35.71 | 19.05 | 26.05 | 19.32 | 11.31 | 27.71 |
| MOR wet, N/mm² | 5.67 | 6.45 | 6.08 | 5.57 | 4.28 | 2.74 | 5.51 |
| MOE dry N/mm² | 2728.2 | 3566.4 | 2606.1 | 3297.3 | 3553.5 | 2246.1 | 4223.7 |
| MOE wet N/mm² | 660.4 | 679.4 | 647.0 | 546.5 | 491.5 | 302.1 | 542.6 |
| Swells, %, ** | 28.13 | 25.08 | 26.56 | 30.94 | 26.09 | 30.62 | 19.29 |
| % after wet test | 44.7 | 40.2 | 47.5 | 43.5 | 47.2 | 46.5 | 45.6 |

*MNRP resin
** at 24 h at 20° C.

These results indicate that MNRP substituted resins, at either 30 or 50% produce OSBs that perform as well or better than those of the control resin formulations.

All citations are herein incorporated by reference.

The present invention has been described with regard to preferred embodiments. However, it will be obvious to persons skilled in the art that a number of variations and modifications can be made without departing from the scope of the invention as described herein.

References

Chum et al., 1989, ACS Symposium Series No. 385, *Adhesives from Renewable Resources*, Hemingway R. W. Conner A. H. eds, American Chemical Society, pp. 135–151.

Forss K. G., Fuhrmann, A. 1979 Finnish plywood, particle board, and fibreboard made with a lignin-based adhesive. Forest Prod. J. vol 29, pp. 39–43.

Himmelblau D. A., Grozdits G. A. 1997, Production of wood composite adhesives with air-blown, fluidized-bed pyrolysis oil.

Kelley et al., 1997, Use of Biomass pyrolysis oils for preparation of modified phenol formaldehyde resins, Vol 1 pp. 557–172

Pakdel, H., Amen-Chen, C., Zhang, J., Roy, C. 1996, Phenolic compounds from vacuum pyrolysis of biomass, pp. 124–131, CPL press Scott 1988, Chemicals and fuels from biomass flash pyrolysis—part of the bioenergy development program, Renewable Energy Branch, Energy Mines and Resources Canada, Ottawa, Canada, DSS Contract File No. 38ST 23216-6-65164;

Sellers 1996; Adhesives Age vol 39: pp. 6–9

White 1995; Forest Prod J. vol 45, pp.21–28

What is claimed is:

1. A natural resin (NR) characterized by comprising:
   i) a phenol content from about 0.001% to about 0.1% (w/w);
   ii) a total phenolic content from about 35% to about 95% (w/w);
   iii) a smoky odour;
   iv) a pH from about 2.0 to about 5.0;
   v) a water content of from about 1 to about 10 wt %;
   vi) an acids content of from about 0.1 to about 5.0 dry wt %; and
   vii) an average molecular weight (wet)/(dry) of from about (300–450)/(350–500) Daltons;
   wherein the NR is solid at room temperature.

2. The NR of claim 1 further characterized by comprising
   i) a water content of from about 3 to about 10 wt %, and a melting point from about 70° C. to about 150° C.

3. The NR of claim 1 further characterized by comprising:
   i) a net calorie value of about 4355 cal/g (18.22 MJ/kg); and
   ii) a gross calorie value of about 4690 cal/g (19.62 MJ/kg).

4. A resin composition comprising the NR of claim 1.

5. The resin composition of claim 4 wherein said resin is an adhesive resin, and said NR is present within said resin composition from about 1% to about 40% (w/w).

6. The resin composition of claim 4, comprising a phenol formaldehyde resin, wherein a portion of the formaldehyde of said phenol-containing formaldehyde resin is replaced with NR.

7. The resin composition of claim 6 wherein NR replaces up to about 50% of said formaldehyde content within said phenol-containing formaldehyde resin.

8. The resin composition of claim 7 comprising a formaldehyde:phenol from about 1.2:1 to about 3:1.

9. The resin composition of claim 8 wherein the formaldehyde:phenol ratio is 1.6:1.

10. The resin composition of claim 4, comprising a phenol formaldehyde resin, wherein up to about 100% of the phenol content, of said phenol-containing formaldehyde resin is replaced with NR.

11. A product prepared using the resin composition of claim 4.

12. A product prepared using the resin composition of claim 5.

13. A product prepared using the resin composition of claim 6.

14. The product of claim 11 comprising, an industrial resin product.

15. The product of claim 14, wherein said industrial resin product is selected from the group consisting of laminated wood, plywood, particle board, high density particle board, oriented strand board, medium density fiber board, hardboard or wafer board, mouldings, linings, insulation, foundry resins, asphalt, concrete, brake linings and grit binders.

16. A method of preparing a solid natural resin (NR) comprising:
   i) liquefying wood, wood bark or other biomass using fast pyrolysis in order to produce vapours and char;
   ii) removing said char from said vapours;
   iii) recovering said vapours to obtain a liquid product; and
   iv) processing said liquid product using distillation/evaporation to produce said solid NR.

17. The method of claim 16 wherein, said step of recovering comprises obtaining said liquid product from a primary recovery unit, a secondary recovery unit or both a primary and a secondary recovery unit.

18. The method of claim 17 wherein said step of processing comprises pretreating said liquid product prior to said distillation/evaporation.

19. The method of claim 18 wherein said pretreating comprises adding water to said liquid product prior to said distillation/evaporation.

20. The method of claim 16 wherein said step of processing further comprises adding water to said NR obtained following distillation/evaporation.

21. A natural resin prepared according to the method of claim 16.

22. A resin composition comprising the a natural resin (NR) prepared according to the method of:
   i) liquefying wood, wood bark or other biomass using fast pyrolysis in order to produce vapours and char;
   ii) removing said char from said vapours;
   iii) recovering said vapours to obtain a liquid product; and
   iv) processing said liquid product using distillation/evaporation to produce said NR.

23. The resin composition of claim 22 wherein said resin composition is an adhesive composition.

24. An industrial product prepared using the adhesive composition of claim 23.

25. The product of claim 24, wherein said industrial resin product is selected from the group consisting of laminated wood, plywood, particle board, high density particle board, oriented strand board, medium density fiber board, hardboard or wafer board, mouldings, linings, insulation, foundry resins, asphalt, concrete, brake linings, and grit binder.

26. The NR of claim 1 further characterized by comprising:
(a) a water content of about 6 wt %;
(b) a pH of about 2.5;
(c) an acid content of about 0.7 dry wt %; and
(d) an NRP index of about 90.

27. The NR of claim 26, further characterized by comprising an average molecular weight of about 388/412 (wet/dry).

28. The NR of claim 1, further characterized by comprising a melting point from about 110° to about 150° C.

29. The NR of claim 28 comprising:
(a) a phenolic content of about 95%;
(b) a hydrocarbon content of about 0.1%;
(c) an acids content of about 1%;
(d) a water content of about 3%; and
(e) a total ester, aldehyde and alcohol content of about 0.9%.

30. The NR of claim 29 further characterized by comprising:
(a) gasoline solubility of about 1%;
(b) an ash content of about 0.01%;
(c) a flash point of greater than about 280° C.;
(d) a density of about 1.19 g/cm3 at 25° C.;
(e) a hydroxyl content of about 1.4%; and
(f) a methoxyl content of about 5.3%.

* * * * *